United States Patent
Matsuo

(10) Patent No.: US 10,776,767 B2
(45) Date of Patent: Sep. 15, 2020

(54) CHECKOUT SYSTEM AND REGISTRATION DEVICE

(71) Applicant: TOSHIBA TEC KABUSHIKI KAISHA, Tokyo (JP)

(72) Inventor: Hisashi Matsuo, Mishima Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 447 days.

(21) Appl. No.: 15/625,213

(22) Filed: Jun. 16, 2017

(65) Prior Publication Data
US 2017/0372287 A1    Dec. 28, 2017

(30) Foreign Application Priority Data
Jun. 23, 2016  (JP) ................. 2016-124324

(51) Int. Cl.
*G06Q 40/00*  (2012.01)
*G06Q 20/20*  (2012.01)
(Continued)

(52) U.S. Cl.
CPC .......... *G06Q 20/204* (2013.01); *G06Q 20/18* (2013.01); *G06Q 20/202* (2013.01); *G06Q 40/12* (2013.12);
(Continued)

(58) Field of Classification Search
CPC ........ G06Q 30/00; G06Q 40/00; G06Q 20/22; G06Q 20/40; G06Q 40/02; G06Q 20/20; G07F 19/00
(Continued)

(56) References Cited

U.S. PATENT DOCUMENTS 8,275,702 B1 *  9/2012  Enriquez ............... G06Q 40/02
                                                        705/39
8,589,259 B2 * 11/2013  Kunieda ............. G06Q 20/201
                                                        705/26.1
(Continued)

FOREIGN PATENT DOCUMENTS

JP      2013-242839       12/2013
JP    2014006856 A  *    1/2014
JP       5898360 B1       4/2016

OTHER PUBLICATIONS

Extended European Search Report dated Oct. 17, 2017 in corresponding European Patent Application No. 17177651.1 (Publication No. EP 3261070 A1), 9 pages.

*Primary Examiner* — Olusegun Goyea
(74) *Attorney, Agent, or Firm* — Kim & Stewart LLP

(57) ABSTRACT

A checkout system according to an embodiment includes a plurality of registration devices and a plurality of settlement devices assigned to each of the plurality of registration devices. The registration device generates accounting data for settlement of a transaction, and transmits the accounting data to a transmission destination. The settlement device determines a current status of the settlement device, and transmits the determined current status to the corresponding assigned registration device. The settlement device receives the accounting data from the corresponding assigned registration device and performs a settlement process for settlement of the transaction on a basis of the accounting data. Each registration device displays a list of either the settlement devices assigned to the registration device or the settlement devices assigned to a different registration device. The determined transmission destination is based on the status and priority ranking of the settlement devices that are displayed on the list.

19 Claims, 14 Drawing Sheets

(51) Int. Cl.
*G06Q 20/18* (2012.01)
*G07G 1/00* (2006.01)
(52) U.S. Cl.
CPC ......... *G07G 1/0009* (2013.01); *G07G 1/0036* (2013.01)
(58) Field of Classification Search
USPC ...................................... 705/30, 26.1, 39, 44
See application file for complete search history.

(56) References Cited

U.S. PATENT DOCUMENTS

| | | | |
|---|---|---|---|
| 2015/0178708 A1* | 6/2015 | Reutov | G06Q 20/027 705/44 |
| 2015/0213425 A1 | 7/2015 | Namura et al. | |
| 2017/0004474 A1 | 1/2017 | Namura | |

* cited by examiner

FIG. 1
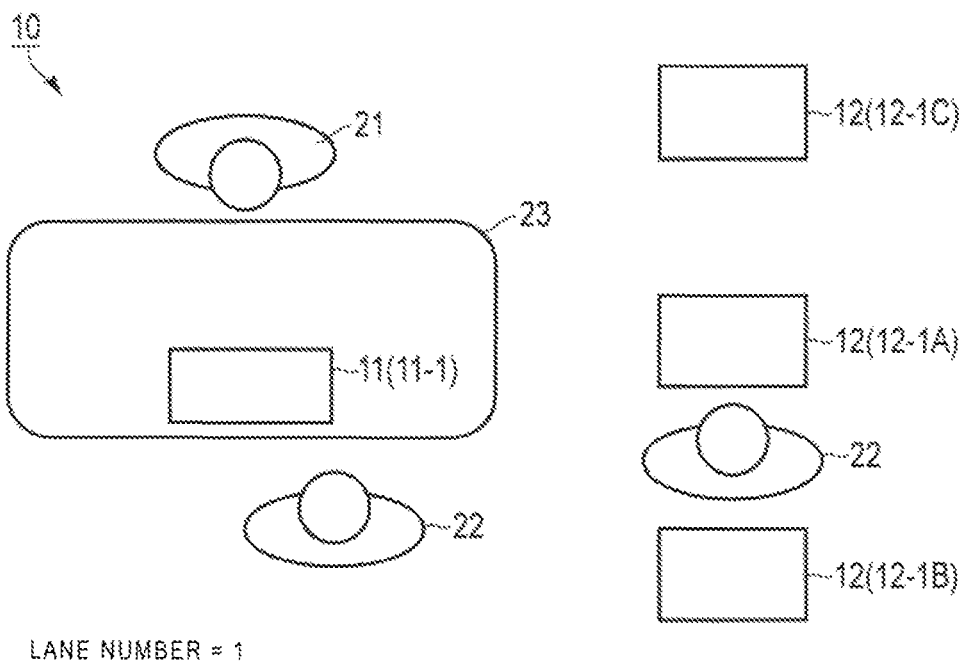
LANE NUMBER = 1
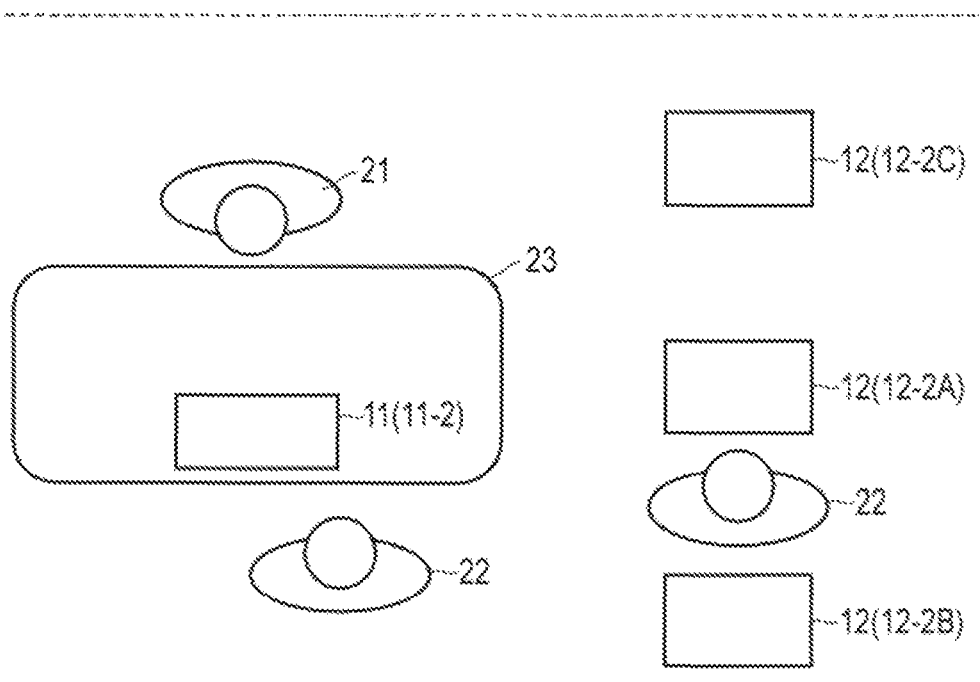
LANE NUMBER = 2

FIG. 3

| COMMODITY CODE | COMMODITY NAME | UNIT PRICE | NUMBER | AMOUNT OF MONEY |
|---|---|---|---|---|
| 123456789 | COMMODITY A | 100 | 1 | 100 |

31

| COMMODITY CODE | COMMODITY NAME | UNIT PRICE | NUMBER | AMOUNT OF MONEY |
|---|---|---|---|---|
| 123423456 | COMMODITY B | 200 | 1 | 200 |
|  |  |  |  |  |
|  |  |  |  |  |
| ⋮ | ⋮ | ⋮ | ⋮ | ⋮ |

32

| TOTAL NUMBER | TOTAL AMOUNT |
|---|---|
| 2 | 300 |

33

| No. | SETTLEMENT DEVICE ID | IDENTIFICATION NAME | STATUS |
|---|---|---|---|
| 1 | 121A | SETTLEMENT DEVICE 1A | ST1 |
| 2 | 121B | SETTLEMENT DEVICE 2B | ST2 |
| 3 | 121C | SETTLEMENT DEVICE 3C | ST3 |

34

35 — SWITCHING DESTINATION

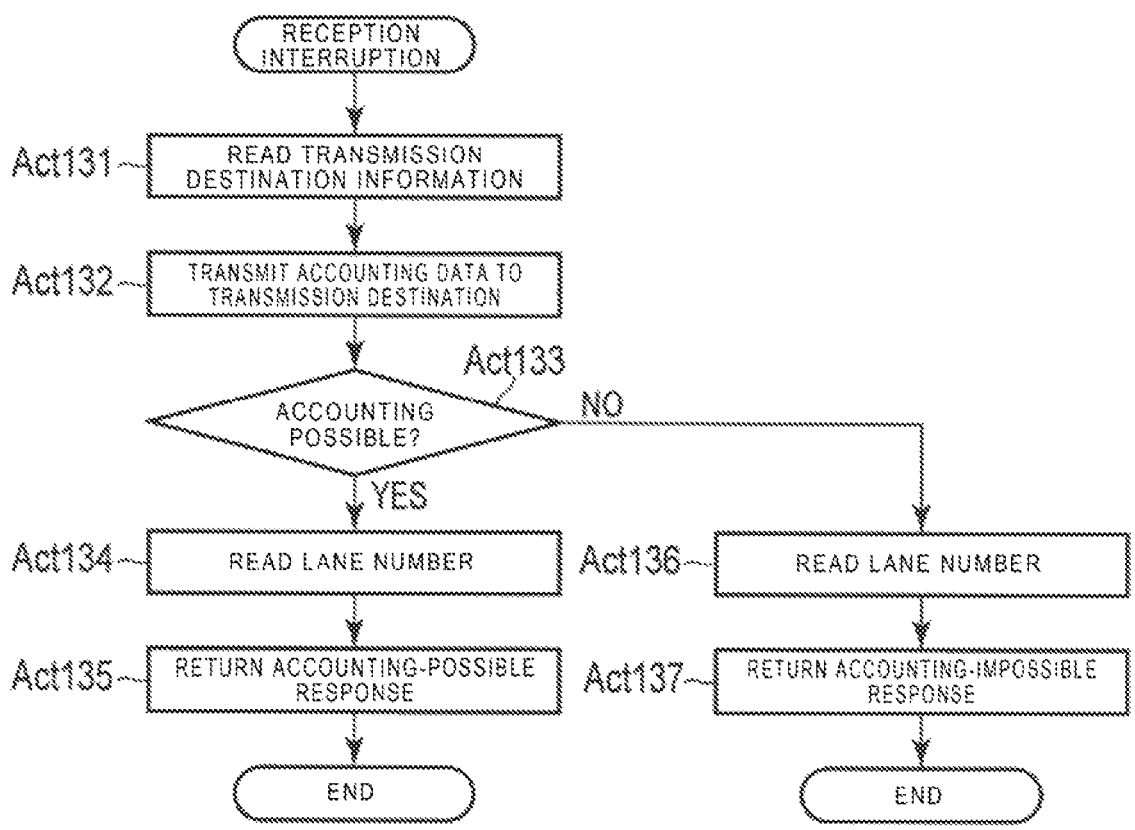

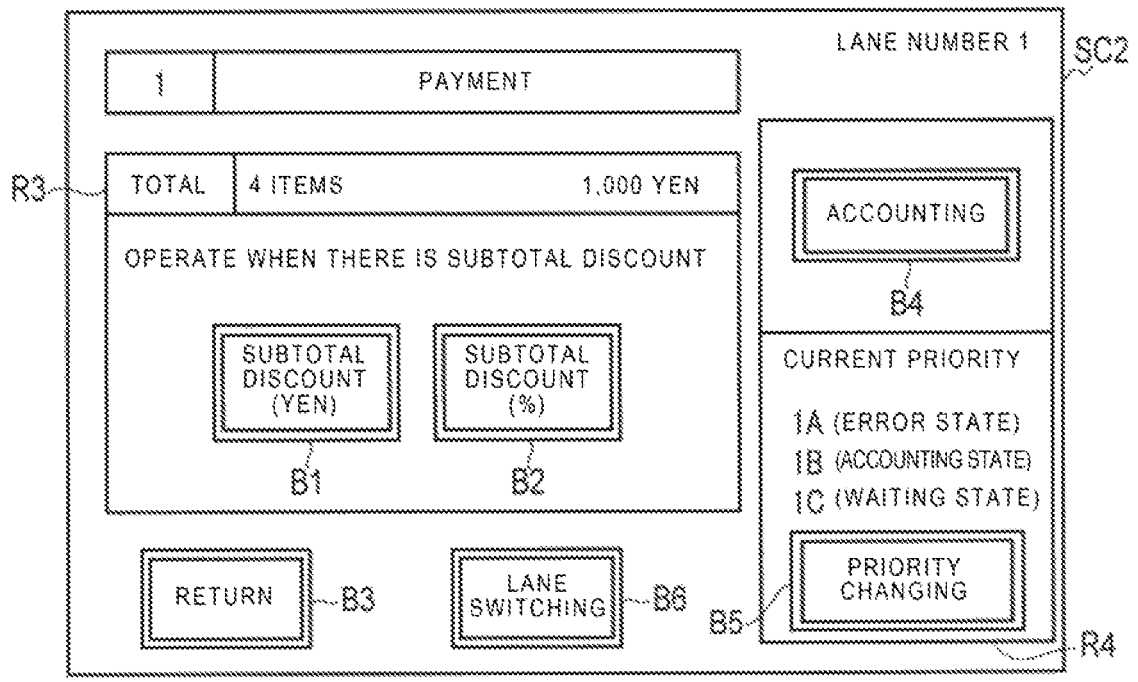

FIG. 18

| | COMMODITY NAME | NUMBER | UNIT PRICE | AMOUNT OF MONEY |
|---|---|---|---|---|
| 1 | COMMODITY A | 1 | 100 | 100 |
| 2 | COMMODITY B | 1 | 200 | 200 |
| 3 | COMMODITY C | 1 | 300 | 300 |

LANE NUMBER 1

1  REGISTRATION

COMMODITY D                 400 YEN

1 ITEM    400 YEN    TOTAL    4 ITEMS 1,000 YEN

SUBTOTAL — B8

LANE SWITCHING — B6

CHECKOUT SYSTEM AND REGISTRATION DEVICE

CROSS-REFERENCE TO RELATED APPLICATION

This application is based upon and claims the benefit of priority from Japanese Patent Application No. 2016-124324, filed Jun. 23, 2016, the entire contents of which are incorporated herein by reference.

FIELD

Embodiments described herein relate generally to a checkout system and a registration device used for a checkout system.

BACKGROUND

In a checkout system for retailers, a registration device generates accounting data required for settlement of a transaction. The registration device is separated from a settlement device performing a settlement process of the transaction on the basis of the accounting data. The registration device waits for input of data related to commodity sales. If data related to commodity sales is input by an operator, the registration device generates accounting data on the basis of the input data, and transmits the accounting data to the settlement device. The settlement device waits for input of payment data with respect to the accounting data. If payment data is input by the operator, the settlement device performs a settlement process of the transaction on the basis of the accounting data and the payment data. A checkout system in which a registration device is separated from a settlement device may be a two-person system in which different salespersons respectively operate the registration device and the settlement device. Alternatively, the checkout system may be a sharing system or a so-called semi-self-service system in which a salesperson operates the registration device, and a shopper operates the settlement device.

In the semi-self-service system, accounting data for a settlement process is transmitted from a registration device to an available settlement device. Thus, if all settlement devices are performing settlement processes, accounting data cannot be transmitted to one of the settlement devices. If accounting data is transmitted to a settlement device in which an error such as receipt sheet shortage or abnormality in a change machine has occurred, a settlement process cannot be performed. Thus, the accounting data must be retransmitted to another settlement device. In this case, a purchase registration process in a registration device is delayed. Accordingly, it is desirable to efficiently perform processes for purchase registration and settlement.

DESCRIPTION OF THE DRAWINGS

FIG. 1 is a schematic diagram of a checkout system according to the present embodiment.

FIG. 3 illustrates an example data structure formed in a RAM of the registration device.

FIG. 12 is a flowchart illustrating an example sequence of operations of an interruption process performed by the registration device when accounting data is received.

FIG. 13 illustrates an example registration screen.

FIG. 14 illustrates an example accounting confirmation screen.

FIG. 18 illustrates another example of a registration screen.

DETAILED DESCRIPTION

Figure 2:
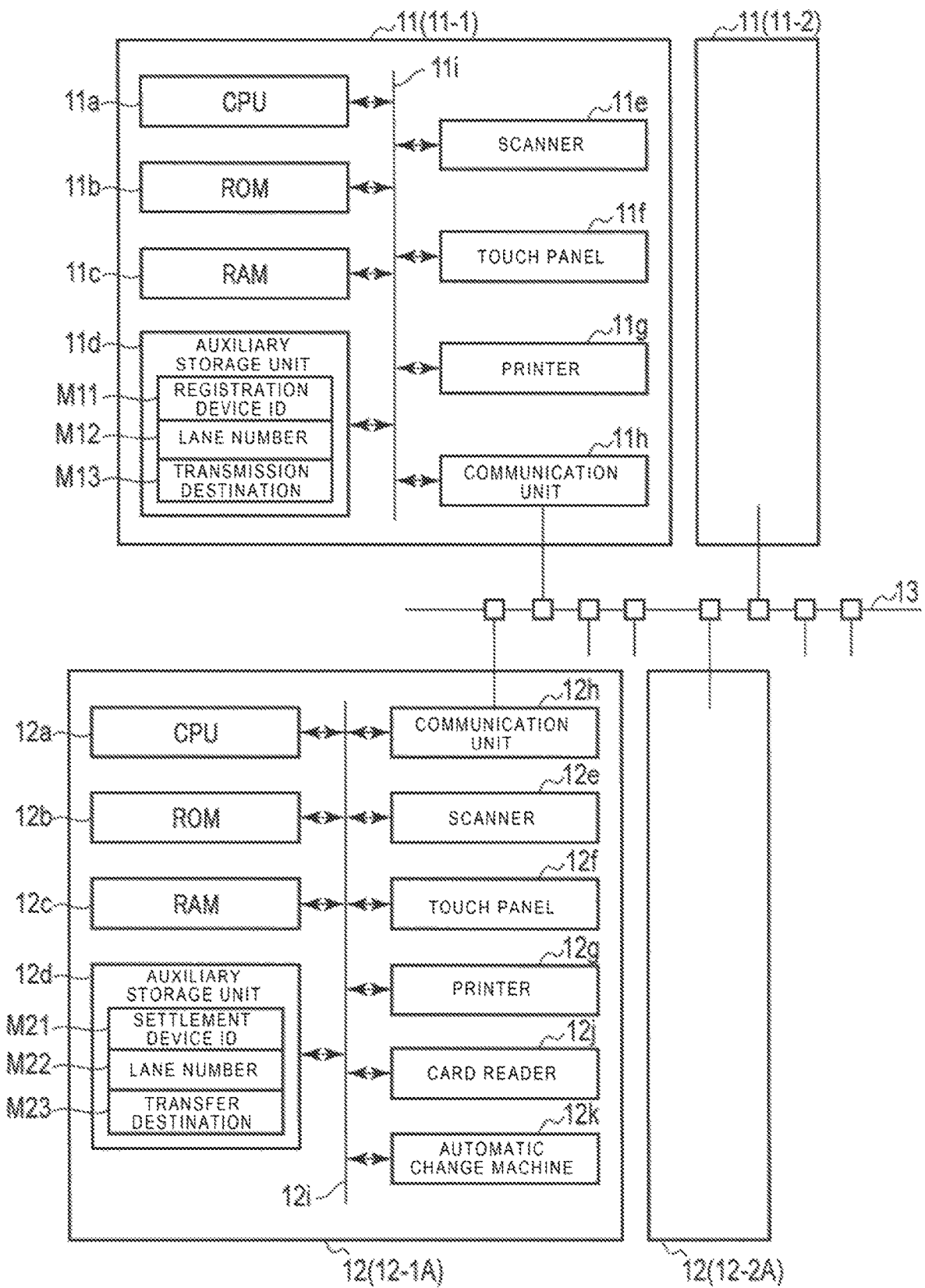
FIG. 2 is a block diagram illustrating an example configuration of a registration device and a settlement device.
Figure 4:
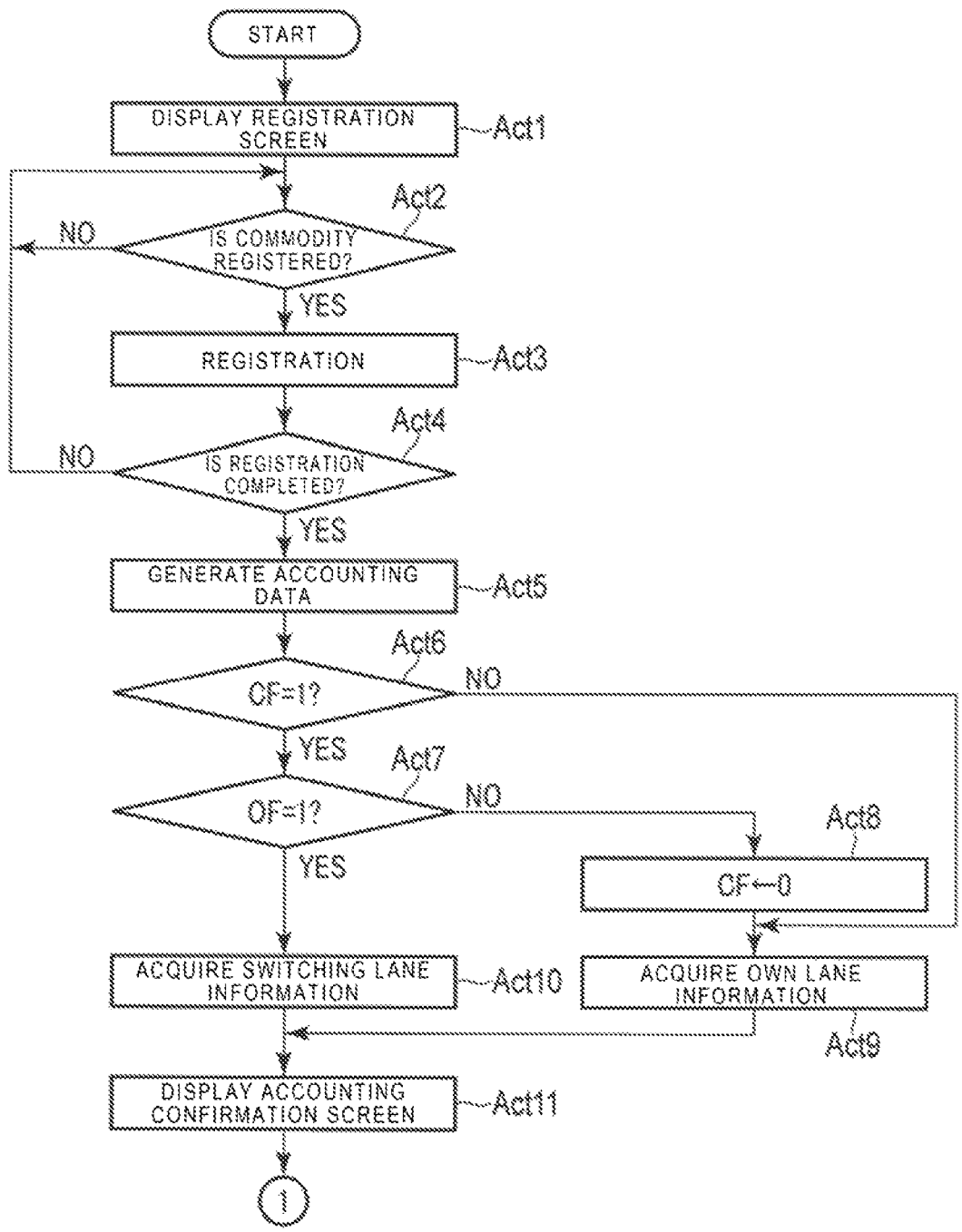
FIGS. 4-9 are flowcharts illustrating an example sequence of a primary process performed by the registration device.
Figure 5:
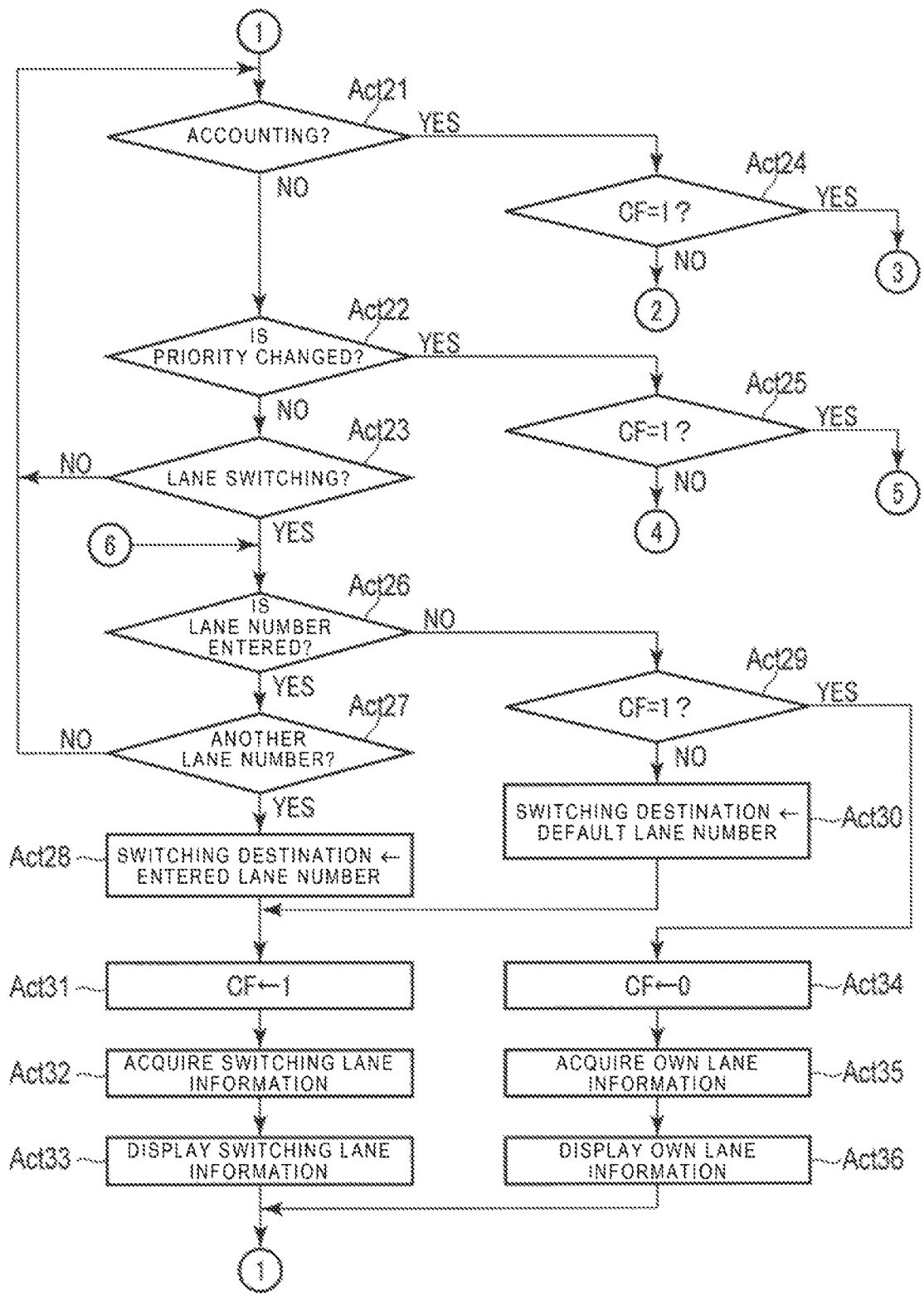

Embodiments provide a checkout system capable of efficiently performing processes for purchase registration and settlement, and a registration device used for this system.

A checkout system according to an embodiment includes a plurality of registration devices and a plurality of settlement devices assigned to each of the plurality of registration devices. The registration device generates accounting data for settlement of a transaction, and transmits the accounting data to a transmission destination. The settlement device determines a current status of the settlement device, and transmits the determined current status to the corresponding assigned registration device. The settlement device receives the accounting data from the corresponding assigned registration device and performs a settlement process for settlement of the transaction on a basis of the accounting data. Each registration device displays a list of either the settlement devices assigned to the registration device or the settlement devices assigned to a different registration device. The list includes the status of the settlement devices that are displayed. The determined transmission destination is based at least on the status and priority ranking of the settlement devices that are displayed on the list.

Hereinafter, an embodiment will be described with reference to the drawings.

FIG. 1 is a schematic diagram of a checkout system 10 according to the present embodiment. The checkout system 10 includes a plurality of registration devices 11 and settlement devices 12. The number of settlement devices 12 is larger than the number of registration devices 11.

The registration devices 11 and the settlement devices 12 are arranged in each checkout lane of a store. Any number of checkout lanes may be used. Any number of registration devices 11 and settlement devices 12 may be arranged in a single checkout lane. FIG. 1 illustrates two checkout lanes. FIG. 1 illustrates a single registration device 11 and three settlement devices 12 arranged in each checkout lane.

A specific number is allocated to each checkout lane. In FIG. 1, a lane number "1" is allocated to the checkout lane on an upper part of the figure, and a lane number "2" is allocated to the checkout lane on a lower part of the figure. A single registration device 11 (11-1) and three settlement devices 12 (12-1A, 12-1B, and 12-1C) are arranged in the checkout lane with the lane number "1". A single registration device 11 (11-2) and three settlement devices 12 (12-2A, 12-2B, and 12-2C) are arranged in the checkout lane with the lane number "2".

The checkout system 10 is a semi-self-service system. In other words, a salesperson 21 who acts as a so-called checker is an operator of the registration device 11. A shopper 22 who wishes to purchase a commodity to be registered with the registration device 11 is an operator of the settlement device 12.

In FIG. 1, the registration device 11 is mounted on a work table 23. The work table 23 has a rectangular top surface. A plurality of work tables 23 are arranged so that longitudinal directions of the top plates are substantially parallel to each other, and thus passages (e.g., checkout lanes) for the shoppers 22 are formed.

The registration device 11 performs various functions such as commodity sales registration, generation of accounting data, and transmission of the accounting data. Commodity sales registration includes registering a commodity purchased by the shopper 22 in the registration device 11. For example, barcodes attached to commodities are scanned by a scanner, and thus data such as the number of sold commodities and a sales amount is registered in the registration device 11. The accounting data is data related to accounting for commodities which are sold and registered in a single transaction. The accounting data includes commodity codes, commodity names, unit prices, a sales number, a sales amount, a total number, a total amount, and the like with respect to sold and registered commodities.

The registration device 11 sets one of the three settlement devices 12 arranged in the same checkout lane as a transmission destination of accounting data. Any settlement device 12 may be set as a transmission destination. The registration device 11 transmits accounting data to the single settlement device 12 set as a transmission destination. The registration device 11 may switch a transmission destination of accounting data to a different registration device 11 arranged in another checkout lane. A transmission destination of accounting data may be switched to a registration device 11 arranged in any checkout lane. The registration device 11 transmits accounting data to a single settlement device 12 set as a transmission destination, or a registration device 11 arranged in another checkout lane.

The settlement device 12 performs a settlement process function. In other words, if accounting data is received from the registration device 11 arranged in the same checkout lane, the settlement device 12 processes settlement of a transaction on the basis of the accounting data. The settlement process is to process a transaction to sell and buy a commodity on the basis of the accounting data. Cash, credit cards, electronic money, and the like are used for settlement. As mentioned above, the settlement device 12 performs a settlement process in cooperation with the registration device 11 arranged in the same checkout lane. However, accounting data as a settlement process target is not limited to accounting data generated by the registration device 11 arranged in the same checkout lane. The settlement device 12 similarly performs a settlement process on accounting data which is transferred from one of the registration devices 11 arranged in another checkout lane to the registration device 11 arranged in the same checkout lane.

FIG. 2 is a block diagram illustrating an example configuration of the registration device 11 and the settlement device 12. The registration device 11 and the settlement devices 12 of each checkout lane are all connected to a local area network (LAN) 13 which is a network in the store. The LAN 13 is connected to a server (not illustrated). The server stores a commodity database in which commodity information such as a commodity name and a unit price are stored in correlation with a commodity code of each commodity. The server may further store other databases.

The registration device 11 and the settlement device 12 transmit and receive information to and from each other via the LAN 13. As a network, other communication networks such as the Internet or a wireless LAN may be used instead of the LAN 13. Information such as accounting data may also be transmitted and received between the registration device 11 and the settlement device 12 via the server. The registration device 11 and the settlement devices 12 may be connected to each other via a communication network in each checkout lane, and the registration devices 11 in different checkout lanes may be connected to each other via another communication network.

The registration device 11 includes a CPU 11a, a ROM 11b, a RAM 11c, an auxiliary storage unit 11d, a scanner 11e, a touch panel 11f, a printer 11g, a communication unit 11h, and a bus 11i.

The CPU 11a is connected to the ROM 11b, the RAM 11c, and the auxiliary storage unit 11d via the bus 11i, and may be provided in a computer. The CPU 11a corresponds to a processor of the computer. The CPU 11a controls the respective hardware elements so as to realize various functions of the registration device 11 on the basis of an operating system, middleware, and application programs stored in the ROM 11b and the RAM 11c.

The ROM 11b corresponds to a main storage unit of the computer. The ROM 11b stores the operating system. The ROM 11b may store the middleware or the application programs. The ROM 11b may store data which is referred to when the CPU 11a performs various processes.

The RAM 11c corresponds to another main storage unit of the computer. The RAM 11c stores data which is referred to when the CPU 11a performs various processes. The RAM 11c is also used as a so-called work area which stores data temporarily used when the CPU 11a performs various processes.

The auxiliary storage unit 11d corresponds to an auxiliary storage unit of the computer. The auxiliary storage unit 11d stores data used when the CPU 11a performs various processes, or data generated through processes in the CPU 11a. As the auxiliary storage unit 11d, for example, an EEPROM, an HDD, or an SSD may be used. The application programs stored in the ROM 11b or the auxiliary storage unit 11d include a control program in which information processing performed by the registration device 11 is described.

The scanner 11e reads a barcode attached to a commodity to obtain a commodity code of the commodity. The touch panel 11f includes a display device and a touch sensor. The touch panel 11f may include a touch panel for a salesperson and a touch panel for a customer. The touch panel 11f for a salesperson is provided on the work table 23 so that a display screen thereof is directed toward a work space side of the salesperson 21. The touch panel 11f for a customer is provided on the work table 23 so that a display screen thereof is directed toward a passage side for the shopper 22. The printer 11g prints various character strings or images on a receipt sheet, so as to issue a receipt. The communication unit 11h is connected to the LAN 13. The communication unit 11h performs data communication with the plurality of settlement devices 12 which are connected thereto via the LAN 13 and are in a cooperation state. The communication unit 11h may perform data communication with another registration device 11 via the LAN 13.

The bus 11i transfers data which is transmitted and received among the CPU 11a, the ROM 11b, the RAM 11c, the auxiliary storage unit 11d, the scanner 11e, the touch panel 11f, the printer 11g, and the communication unit 11h. The bus 11i may employ a well-known system such as a system bus and various interface circuits connecting respective units to each other. As hardware of the registration device 11, for example, an existing POS terminal may be used.

The settlement device 12 includes a CPU 12a, a ROM 12b, a RAM 12c, an auxiliary storage unit 12d, a scanner 12e, a touch panel 12f, a printer 12g, a communication unit 12h, a card reader/writer 12j, an automatic change machine 12k, and a bus 12i.

The card reader/writer 12j reads data recorded on a card, and writes data on the card. The card includes settlement cards such as a credit card, a debit card, an electronic money card, and a prepaid card, for example. The automatic change machine 12k receives input coins and bank notes. The automatic change machine 12k discharges coins and bank notes as change. The CPU 12a, the ROM 12b, the RAM 12c, the auxiliary storage unit 12d, the scanner 12e, the touch panel 12f, the printer 12g, the communication unit 12h, and the bus 12i have the same functions as those of the registration device 11. In other words, the CPU 12a is connected to the ROM 12b, the RAM 12c, and the auxiliary storage unit 12d via the bus 12i, and may be provided as a computer. The CPU 12a controls the respective hardware elements so as to realize various functions of the settlement device 12 on the basis of an operating system, middleware, and application programs stored in the ROM 12b and the RAM 12c. The application programs stored in the ROM 12b or the auxiliary storage unit 12d include a control program in which information processing performed by the settlement device 12 is described. As hardware of the settlement device 12, for example, a POS terminal corresponding to an existing self-checkout type may be used.

In the checkout system 10 including the registration device 11 and the settlement device 12 configured in the above-described way, data storage areas M11, M12 and M13 are allocated in the auxiliary storage unit 11d of the registration device 11, and data storage areas M21, M22 and M23 are allocated in the auxiliary storage unit 12d of the settlement device 12.

The data storage area M11 stores a registration device ID. A specific registration device ID is set in each registration device 11, and the registration device ID of the registration device 11 is stored in the data storage area M11. Hereinafter, the data storage area M11 will be referred to as a registration device ID storage M11.

The data storage area M12 is a region storing a lane number. A specific lane number is set in a checkout lane in which each registration device 11 is disposed, and the lane number of the checkout lane in which the registration device 11 is arranged is stored in the data storage area M12. Hereinafter, the data storage area M12 will be referred to as a lane number storage area M12.

The data storage area M13 stores transmission destination information. The transmission destination information is information for identifying the settlement device 12 which is a transmission destination of accounting data. One of a plurality of settlement devices 12 which are arranged in the same checkout lane as that of the registration device 11 and are in cooperation with the registration device 11 is set as a transmission destination of accounting data. A specific ID is set in each settlement device 12 in advance. This ID may be used as transmission destination information. Alternatively, a number, a symbol, a code, or the like may be allocated in correlation with the ID of each settlement device 12, and may be used as transmission destination information. Hereinafter, the data storage area M13 will be referred to as a transmission destination storage area M13.

The data storage area M21 stores a settlement device ID. A specific settlement device ID is set in each settlement device 12, and the settlement device ID of the settlement device 12 is stored in the data storage area M21. Hereinafter, the data storage area M21 will be referred to as a settlement device ID storage area M21.

The data storage area M22 stores a lane number. A specific lane number is set in a checkout lane in which each settlement device 12 is disposed, and the lane number of the checkout lane in which the settlement device 12 is arranged is stored in the data storage area M22. Hereinafter, the data storage area M22 will be referred to as a lane number storage area M22.

The data storage area M23 stores transfer destination information. The transfer destination information identifies another settlement device 12 as a transfer destination of accounting data. One of other settlement devices 12 which are arranged in the same checkout lane as that of the settlement device 12 is set as a transfer destination of accounting data. A specific ID is set in each settlement device 12 in advance. This ID may be used as transfer destination information. Alternatively, a number, a symbol, a code, or the like may be allocated in correlation with the ID of each settlement device 12, and may be used as transfer destination information. Hereinafter, the data storage area M23 will be referred to as a transfer destination storage area M23.

In the checkout system 10, data structures 31, 32, 33, 34 and 35 illustrated in FIG. 3 are formed in the RAM 11c of the registration device 11.

The data structure 31 temporarily stores a commodity code, a commodity name, a unit price, the number, and an amount of money of a single commodity which is sold and registered. The commodity code is a specific code for identifying each commodity. For example, a commodity code indicated by a barcode is attached to each commodity, and the scanner 11e scans the barcode so that the registration device 11 can acquire the commodity code. The commodity name and the unit price is the name of a commodity and a price per item identified by a corresponding commodity code. The number is a sales number of commodities, and the amount is an amount of money corresponding to the sales amount. Hereinafter, the data structure 31 will be referred to as temporary memory 31.

The data structure 32 stores data regarding all commodities which are sold and registered in a single transaction. The data includes respective items such as a commodity code, a commodity name, a unit price, the number, and an amount of money. Hereinafter, the data structure 32 will be referred to as a transaction memory 32.

The data structure 33 stores a total number and a total price of all commodities which are sold and registered in a single transaction. Hereinafter, the data structure 33 will be referred to as a total memory 33.

The data structure 34 stores a settlement device ID, an identification name, and status information in correlation with a serial number starting from "1". Among the plurality of settlement devices 12 in a cooperation state with the registration device 11, a settlement device ID, an identification name, and status information of the settlement device 12 for which the priority for accounting data transfer is set to the first place are stored in row number "1". Similarly, a settlement device ID, an identification name, and status information of the settlement device 12 for which the priority is set to the second place are stored in row number "2", and a settlement device ID, an identification name, and status information of the settlement device 12 for which the priority is set to the third place are stored in row of number "3". Hereinafter, the data structure 34 will be referred to as a priority memory 34.

The number of rows of the priority memory 34 depends on the number of settlement devices 12 assigned to a single registration device 11. Hereinafter, the description assumes that the number of settlement devices 12 assigned to a single registration device 11 is three.

The settlement device 12 identified by the transmission destination information stored in the transmission destination storage area M13 of the registration device 11 has the first priority for accounting data transfer. The settlement device 12 identified in the transfer destination storage area M23 of the settlement device 12 with the first priority has a second priority, and the settlement device 12 identified in the transfer destination storage area M23 of the settlement device 12 with the second priority has a third priority. Information identifying the settlement device 12 having the first priority is stored in the transfer destination storage area M23 of the settlement device 12 with the third priority.

Any method of determining priority may be used. For example, priority may be set in order of a settlement device closest to the cooperating registration device 11. Priority may be changed depending on a state of the settlement device 12.

A state of the settlement device 12 is indicated by status information. The state includes a waiting state, an accounting state, and an error state. The waiting state is a state of waiting for accounting data. The accounting state is a state of performing a settlement process on the basis of accounting data. The error state is a state in which a malfunction or a warning occurs in the settlement device 12, and thus a settlement process cannot be performed. For example, excess or shortage of change in the automatic change machine 12k, receipt sheet shortage in the printer 12g, and the like may occur, and the status information indicates an error state. In the present embodiment, status information ST indicating a waiting state is "0", the status information ST indicating an accounting state is "1", and the status information ST indicating an error state is "2".

The data structure 35 stores a lane number of a checkout lane with another registration device 11 as the transmission destination is arranged when a transmission destination of accounting data is switched to another registration device 11. Hereinafter, the data structure 35 will be referred to as a switching destination memory 35.

Figure 10:
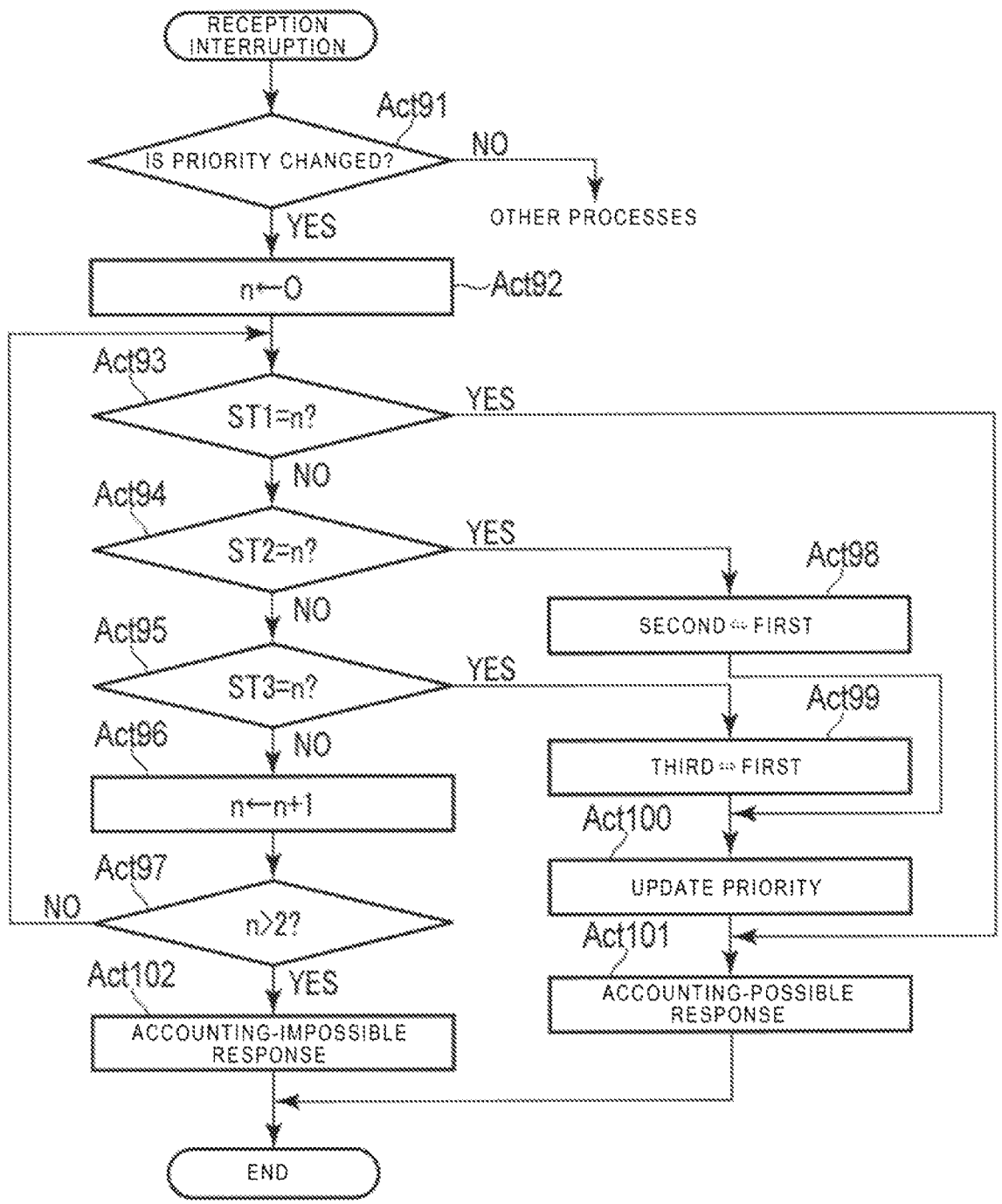
FIG. 10 is a flowchart illustrating an example sequence of an interruption process performed by the registration device when a priority changing command is received.
Figure 11:
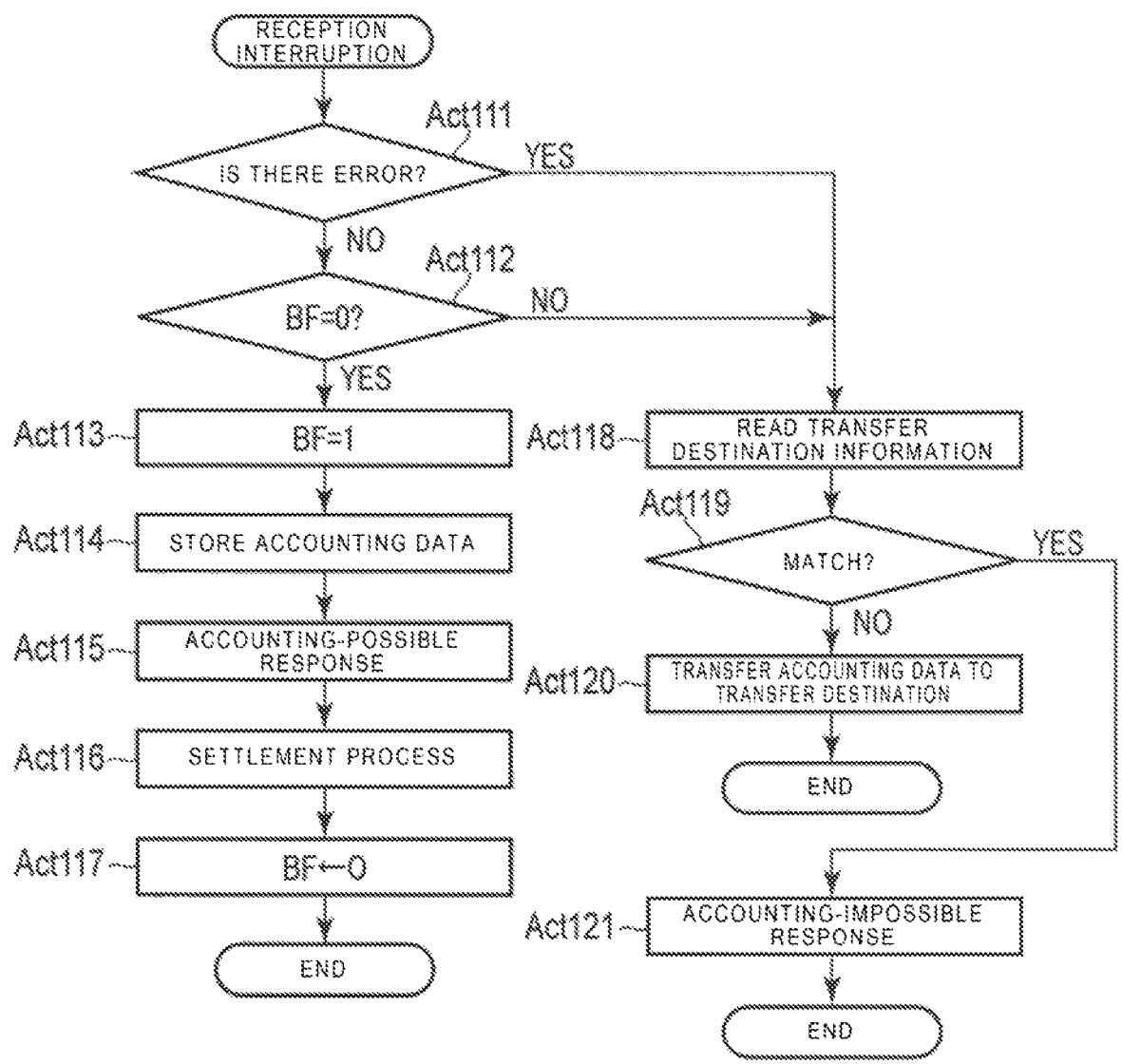
FIG. 11 is a flowchart illustrating an example sequence of operations of an interruption process performed by the settlement device when accounting data is received.

FIGS. 4 to 9 are flowcharts illustrating an example of a primary process performed by the CPU 11a of the registration device 11. FIG. 10 is a flowchart illustrating sequence of an interruption process performed by the CPU 11a of the registration device 11 when a priority changing command transmitted from another registration device 11 is received. FIG. 11 is a flowchart illustrating an example of an interruption process performed by the CPU 12a of the settlement device 12 when accounting data is received. FIG. 12 is a flowchart illustrating an example of an interruption process performed by the CPU 11a of the registration device 11 when accounting data transferred from another registration device 11 is received. FIGS. 13 to 17 illustrate example screens displayed on the touch panel 11f of the registration device 11.

Hereinafter, with reference to FIGS. 1 to 17, description will be made of information processing operation of the checkout system 10 focusing on the registration device 11-1 provided in the checkout lane with the lane number 1. The content of a process described below is only an example, and various processes causing the same result may be used as appropriate.

If the registration device 11-1 is activated in a mode for registering a commodity, the CPU 11a starts information processing according to procedures illustrated in the flowcharts of FIGS. 4 to 9. This processing is performed according to the control program stored in the ROM 11b or the auxiliary storage unit 11d.

First, the CPU 11a displays a registration screen SC1 (refer to FIG. 13) on a part of a screen of the touch panel 11f in Act 1.

The registration screen SC1 displays the content of the temporary memory 31, the transaction memory 32, and the total memory 33, and allows the salesperson 21 to confirm a registration status. FIG. 13 illustrates an example of the registration screen SC1. The registration screen SC1 includes display regions R1 and R2. The display region R1 displays the content of the temporary memory 31, that is, a commodity name, a unit price, a sales number, and a sales amount regarding a commodity last registered, and the content of the total memory 33, that is, a total number of purchased commodities and a total amount after the commodity is registered. The display region R2 displays the content of the transaction memory 32, that is, a list of a commodity name, a unit price, a sales number, and a sales amount for each commodity registered prior to the commodity displayed in the display region R1.

Although not illustrated, the CPU 11a displays various function buttons such as a commodity button for the salesperson 21 designating a commodity or a subtotal button in a region other than the region for the registration screen SC1 on the screen of the touch panel 11f.

By confirming that the registration screen SC1 is displayed on the touch panel 11f, the salesperson 21 recognizes that the purchased commodities can be sold and registered. If the shopper 22 carries the purchased commodities to the work table 23, the salesperson 21 operates, for example, the scanner 11e or the commodity button so as to sequentially input commodity codes of the purchased commodities. If the commodity codes of all of the purchased commodities are input, the salesperson 21 touches the subtotal button. Through the above-described operation, sales registration of commodities purchased by a single shopper is completed.

The CPU 11a of the registration device 11-1 performs the following information process in relation to such a sales registration operation. First, the CPU 11a waits for a commodity to be registered in Act 2. If a commodity code is input by using the scanner 11e or the commodity button (YES in step Act 2), the CPU 11a registers commodity sales data in Act 3. In other words, the CPU 11a acquires commodity information such as a commodity name and a unit price which are set in the commodity database in correlation with the commodity code. The CPU 11a multiplies the unit price by the sales number so as to calculate an amount of money corresponding to the sales number, that is, a so-called sales amount. If a number value is set by using ten keys before a commodity code is input, the sales number is the numerical value, and, if a numerical value is not set, the sales number is "1". In the above-described way, the CPU 11a generates commodity sales data including the commodity code, the commodity name, the unit price, the sales number, and the sales amount. The CPU 11a temporarily stores the commodity sales data in the temporary memory 31. If sales data of purchased commodities whose sales registration is performed immediately before is already stored in the temporary memory 31, the CPU 11a saves the stored commodity sales data to the transaction memory 32, and stores the new commodity sales data in the temporary memory 31. The CPU 11*a* adds the sales number and the sales amount of the commodity sales data to the total memory 33. The CPU 11*a* updates the registration screen SC1 on the basis of the data of the temporary memory 31, the transaction memory 32, and the total memory 33.

The CPU 11*a* checks whether or not completion of registration of the sold commodities is declared in Act 4. For example, if the subtotal button is touched, the CPU 11*a* determines that registration completion is declared. If registration completion is not indicated (NO in Act 4), CPU 11*a* returns to Act 2, and waits for the next commodity registration. If registration completion is indicated (YES in Act 4), CPU 11*a* generates accounting data on the basis of the data of the temporary memory 31, the transaction memory 32, and the total memory 33 in Act 5. Here, the CPU 11*a* of the registration device 11-1 functions as a generation unit which generates accounting data required for settlement of the transaction on the basis of data related to commodity sales, through the processes in Act 2 to Act 5 performed by the CPU 11*a*.

When the accounting data is generated, the CPU 11*a* checks a switching flag CF in Act 6. The switching flag CF is set to "1" if a transmission destination of the accounting data was switched from the cooperating settlement devices 12-1A, 12-1B and 12-1C to another registration device 11-2 in at least the previous commercial transaction. If a transmission destination of accounting data is the cooperating settlement devices 12-1A, 12-1B and 12-1C, the switching flag CF is set to "0". A 1-bit data stored in the RAM 11*c* may be used as the switching flag CF.

If the switching flag CF is set to "1" (YES in Act 6), the CPU 11*a* examines an option flag OF in Act 7. If a transmission destination of accounting data is switched to another registration device 11-2, the option flag OF is a flag for identifying whether the switching is to be maintained or is returned to an original state in the following commercial transaction. In the present embodiment, if switching is maintained, a value of the option flag OF is set to "1", and, if switching is returned to an original state, a value thereof is set to "0". A 1-bit data stored in the auxiliary storage unit 11*d* may be used as the option flag OF. The option flag OF may be set to "1" or "0" in a setting mode which is executed separately from the mode of performing registration.

If the option flag OF is set to "0" (NO in Act 7), the CPU 11*a* resets the switching flag CF to "0" in Act 8. The CPU 11*a* acquires own lane information in Act 9. Also if the switching flag CF is set to "0" (NO in Act 6), the CPU 11*a* acquires own lane information in Act 9.

The own lane information includes settlement device IDs, identification names, and status information of the settlement devices 12-1A, 12-1B and 12-1C assigned to the registration device 11-1. First, the CPU 11*a* acquires a settlement device ID, an identification name, and status information from a settlement device identified by transmission destination information stored in the transmission destination storage area M13, for example, the settlement device 12-1A. The CPU 11*a* sets the settlement device ID, the identification name, and the status information in the row of the number "1" of the priority memory 34. Next, the CPU 11*a* reads transfer destination information stored in the transfer destination storage area M23 from the settlement device 12-1A having the settlement device ID which is set in the row of the number "1". The CPU 11*a* acquires a settlement device ID, an identification name, and status information from a settlement device identified by the transfer destination information, for example, the settlement device 12-1B, and sets the settlement device ID, the identification name, and the status information in the row of the number "2" of the priority memory 34. Next, the CPU 11*a* reads transfer destination information stored in the transfer destination storage area M23 from the settlement device 12-1B having the settlement device ID which is set in the row of the number "2". The CPU 11*a* acquires a settlement device ID, an identification name, and status information from a settlement device identified by the transfer destination information, for example, the settlement device 12-1C, and sets the settlement device ID, the identification name, and the status information in the row of the number "3" of the priority memory 34.

On the other hand, if the option flag OF is set to "1" (YES in Act 7), the CPU 11*a* acquires switching lane information in Act 10. The switching lane information includes settlement device IDs, identification names, and status information of the settlement devices 12-2A, 12-2B and 12-2C assigned to another registration device to which switching occurs as a transmission destination of accounting data, for example, the registration device 11-2. The CPU 11*a* instructs the communication unit 11*h* to transmit a lane information request command to another registration device 11-2 arranged in a checkout lane corresponding to the lane number stored in the switching destination memory 35. The communication unit 11*h* receives the instruction, and then sends a lane information request command having a communication address of another registration device 11-2 as a transmission destination address to the LAN 13. A transmission source address of the lane information request command is a communication address of the registration device 11-1. The lane information request command is received by a single registration device 11-2 in which the transmission destination address is set to a communication address among a plurality of registration devices 11 connected to the LAN 13.

The CPU 11*a* of the registration device 11-2 receiving the lane information request command performs the same process as the own lane information acquisition process in the above Act 9. The CPU 11*a* instructs the communication unit 11*h* to transmit the data stored in the priority memory 34 to the registration device 11-1 which is a command transmission source. The communication unit 11*h* receives the instruction, then generates a data message in which the transmission source address of the lane information request command is set as a transmission destination address, and sends the data message to the LAN 13. The data message includes the data of the priority memory 34.

The CPU 11*a* of the registration device 11-1 which transmitted the lane information request command waits for the data message from another registration device 11-2 which is a command transmission destination. If the data message is received, the CPU 11*a* overwrites the data included in the data message on the priority memory 34 of the registration device 11-1.

If the own lane information acquisition process in Act 9 or the switching lane information acquisition process in Act 10 is completed, the CPU 11*a* displays an accounting confirmation screen SC2 (refer to FIG. 14) on a part of the screen of the touch panel 11*f* in Act 11.

FIG. 14 illustrates an example of the accounting confirmation screen SC2. The accounting confirmation screen SC2 includes display regions R3 and R4, and buttons B1, B2, B3, B4, B5 and B6. The display region R3 displays a total number, a total amount, and the like of commodities stored in the total memory 33.

The display region R4 displays a priority and a state of each settlement device 12 on the basis of the data of the priority memory 34. In other words, if the data of the priority memory 34 is data obtained through the own lane information acquisition process, the display region R4 displays priorities and states of the settlement devices 12-1A, 12-1B and 12-1C assigned to the registration device 11-1. If the data of the priority memory 34 is data obtained through the switching lane information acquisition process, the display region R4 displays priorities and states of the settlement devices 12-2A, 12-2B and 12-2C assigned to the other registration device 11-2 set as a transmission destination of accounting data.

The buttons B1 and B2 are a subtotal discount button B1 and a subtotal discount button B2 for the salesperson 21 to designate that discount is applied to the total amount. The button B3 is a return button B3 for the salesperson 21 to designate that a partial region of the screen of the touch panel 11f is returned to the registration screen SC1. The button B4 is an accounting button B4 for the salesperson 21 designating that registration of commodities for a single transaction is completed, and transition to accounting occurs. The button B5 is a priority changing button B5 for the salesperson 21 to designate that a priority of the settlement device 12 is changed. The button B6 is a lane switching button B6 for the salesperson 21 to designate that a transmission destination of accounting data is switched from the settlement devices 12-1A, 12-1B and 12-1C assigned to the registration device 11-1 to a registration device arranged in another checkout lane, for example, the registration device 11-2.

Therefore, when commodity registration in a single commercial transaction is completed, if accounting data is not transmitted to a registration device in another checkout lane, for example, the registration device 11-2 in the previous commercial transaction, and the option flag OF is set to "0." Even though the accounting data is transmitted to the registration device 11-2, states of the plurality of settlement devices 12-1A, 12-1B and 12-1C assigned to the registration device 11-1 are displayed in the order of priority thereof on the touch panel 11f of the registration device 11-1. If accounting data was transmitted to a registration device in another checkout lane (for example, the registration device 11-2 in the previous commercial transaction), and the option flag OF is set to "1", states of the plurality of settlement devices 12-2A, 12-2B and 12-2C assigned to the registration device 11-2 in another checkout lane are displayed in the order of priorities thereof. Here, the registration device 11-1 functions as a first display unit in cooperation with the touch panel 11f through the processes in Act 9 and Act 11 performed by the CPU 11a. The registration device 11-1 functions as a second display unit in cooperation with the touch panel 11f through the processes in Act 10 and Act 11.

The salesperson 21 who checked the accounting confirmation screen SC2 determines whether a priority of a settlement device is preferably changed or a transmission destination of accounting data is preferably changed by referring to information displayed in the display region R4. For example, if a state of the settlement device 12-1A having the first priority is a "waiting state", and a settlement process can be performed, it is not necessary to change a priority or a transmission destination of accounting data. In this case, the salesperson 21 presses the accounting button B4.

As illustrated in FIG. 14, if a state of the settlement device 12-1A having the first priority is an "error state", a state of the settlement device 12-1B having the second priority is an "accounting state", and a state of the settlement device 12-1C having the third priority is a "waiting state", the settlement device 12-1C having the third priority performs a settlement process. In this case, it is efficient to change a priority, and thus the salesperson 21 presses the priority changing button B5.

If the cooperating settlement devices 12-1A, 12-1B and 12-1C cannot perform the settlement process, or the shopper 22 desires to perform accounting in another checkout lane, it is necessary to change a transmission destination for the accounting data. In this case, the salesperson 21 presses the lane switching button B6.

The CPU 11a displaying the accounting confirmation screen SC2 waits for the accounting button B4 to be pressed in Act 21, waits for the priority changing button B5 to be pressed in Act 22, and waits for the lane switching button B6 to be pressed in Act 23. If the other buttons B1 to B3 are pressed, the CPU 11a performs processes based on the buttons.

If the accounting button B4 is pressed (YES in Act 21), the CPU 11a examines the switching flag CF in Act 24. If the switching flag CF is set to "0" (NO in Act 24), information processing is performed according to procedures illustrated in the flowchart of FIG. 6. If the switching flag CF is set to "1" (YES in Act 24), information processing is performed according to procedures illustrated in the flowchart of FIG. 7. This information processing will be described later in detail.

If the priority changing button B5 is also pressed (YES in Act 22), the CPU 11a examines the switching flag CF in Act 25. If the switching flag CF is set to "0" (NO in Act 25), information processing is performed according to procedures illustrated in the flowchart of FIG. 8. If the switching flag CF is set to "1" (YES in Act 25), information processing is performed according to procedures illustrated in the flowchart of FIG. 9, as will be described later in detail.

On the other hand, if the lane switching button B6 is touched (YES in Act 23), the CPU 11a checks whether or not a lane number is entered in Act 26. If a transmission destination for accounting data is changed, the salesperson 21 enters a lane number of a checkout lane to be set as a switching destination on the touch panel 11f. A lane number of an adjacent checkout lane (if there are horizontally adjacent checkout lanes, one of the checkout lanes) is set in each registration device 11 as a default value. Thus, if a switching destination is preferably a default checkout lane, the salesperson 21 may omit entry of a lane number.

If the lane number is entered (YES in Act 26), the CPU 11a checks whether or not the lane number matches a lane number stored in the lane number storage area M12 in Act 27. If the lane number matches the store lane number (YES in Act 27), the entered lane number is a number of the checkout lane in which the own registration device is disposed. In this case, the CPU 11a invalidates the entry of the lane number. The CPU 11a then returns to the process in Act 21, and waits for the next pressing of a button.

If the entered lane number does not match the lane number stored in the lane number storage area M12, that is, the lane number of another checkout lane is entered (YES in Act 27), the CPU 11a stores the entered lane number in the switching destination memory 35 in Act 28.

On the other hand, if a lane number is not entered (NO in Act 26), the CPU 11a examines the switching flag CF in Act 29. If the switching flag CF is set to "0" (NO in Act 29), the CPU 11a stores a default lane number in the switching destination memory 35 in Act 30.

If the lane number is stored in the switching destination memory 35 through the process in Act 28 or Act 30, the CPU 11a sets the switching flag CF to "1" in Act 31. If the switching flag CF is already set to "1", the CPU 11a maintains the state. Next, the CPU 11a acquires switching lane information in Act 32. This process is the same as the process in Act 10. If the switching lane information is acquired, in Act 33, the CPU 11a updates the content of the display region R4 of the accounting confirmation screen SC2 to the content of the switching lane information acquired through the process in Act 32. The CPU 11a then returns to the process in Act 21, and waits for the next pressing of a button.

As mentioned above, if the salesperson 21 presses the lane switching button B6 so as to switch a transmission destination of accounting data to a registration device in another checkout lane, for example, the registration device 11-2, states of the plurality of settlement devices 12-2A, 12-2B and 12-2C designated as a switching destination are displayed in the order of priorities thereof on the touch panel 11f.

Figure 15:
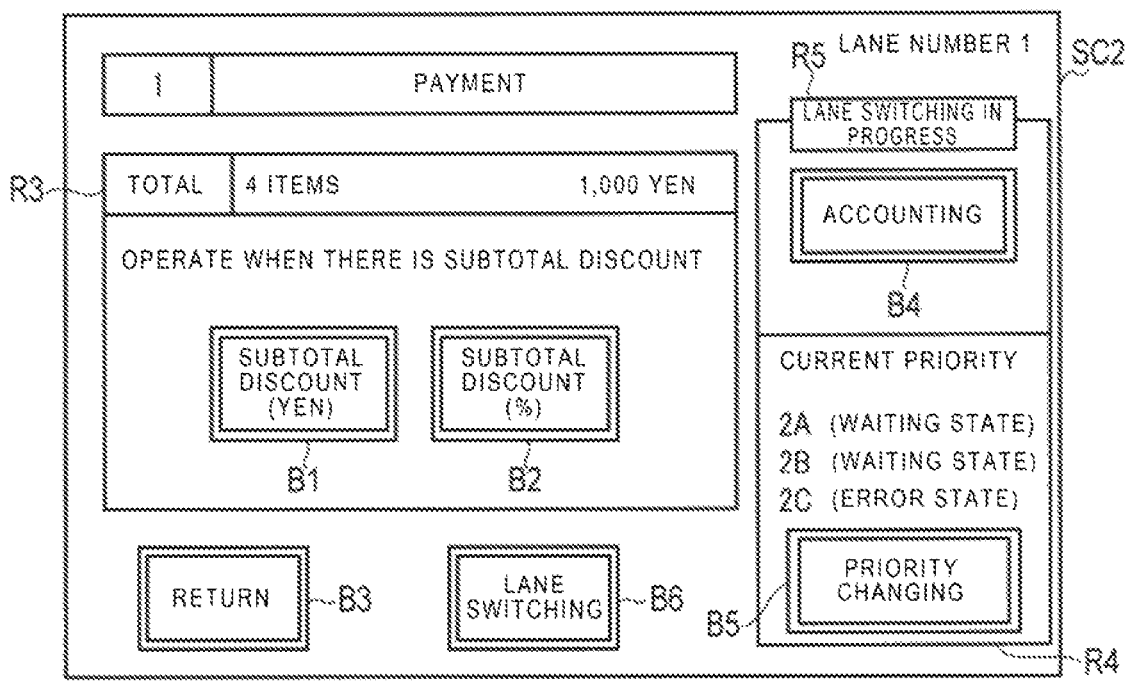
FIG. 15 illustrates an example accounting confirmation screen during switching between lanes.

FIG. 15 illustrates an example in which the content of the display region R4 of the accounting confirmation screen SC2 is updated to the content of the switching lane information. Status information of the settlement devices 12-2A, 12-2B and 12-2C arranged in the checkout lane as a switching destination is displayed in the order of higher priority in the display region R4. A display region R5 is formed on an image surrounding the accounting button B4, and guidance "lane switching in progress" for notifying that switching between checkout lanes currently occurs is displayed in the display region R5. A color of a frame surrounding the accounting button B4 may also be changed compared with the screen example illustrated in FIG. 14.

Therefore, the salesperson 21 can understand states of the settlement devices 12-2A, 12-2B and 12-2C set as a transmission destination of accounting data while staying at the checkout lane in which the registration device 11-1 is provided. Here, the registration device 11-1 functions as a notification unit notifying that accounting data is transferred to another registration device in cooperation with the touch panel 12f through the process in Act 33 executed by the CPU 11a.

On the other hand, if a transmission destination of accounting data is also returned to the cooperating settlement devices 12-1A, 12-1B and 12-1C from another registration device, for example, the registration device 11-2, the salesperson 21 presses the lane switching button B6. In other words, if the lane switching button B6 is touched without entering a lane number in a state in which the switching flag CF is set to "1", a result in the process in Act 29 is "YES". In this case, the CPU 11a resets the switching flag CF to "0" in Act 34. Next, the CPU 11a acquires own lane information in Act 35. This process is the same as the process in Act 9. If the own lane information is acquired, in Act 36, the CPU 11a updates the content of the display region R4 of the accounting confirmation screen SC2 to the content of the own lane information acquired through the process in Act 35. The CPU 11a then returns to the process in Act 21, and waits for the next pressing of a button.

As mentioned above, if a transmission destination of accounting data is returned to the cooperating settlement device 12 from another registration device, the salesperson 21 may only press the lane switching button B6.

Figure 6:
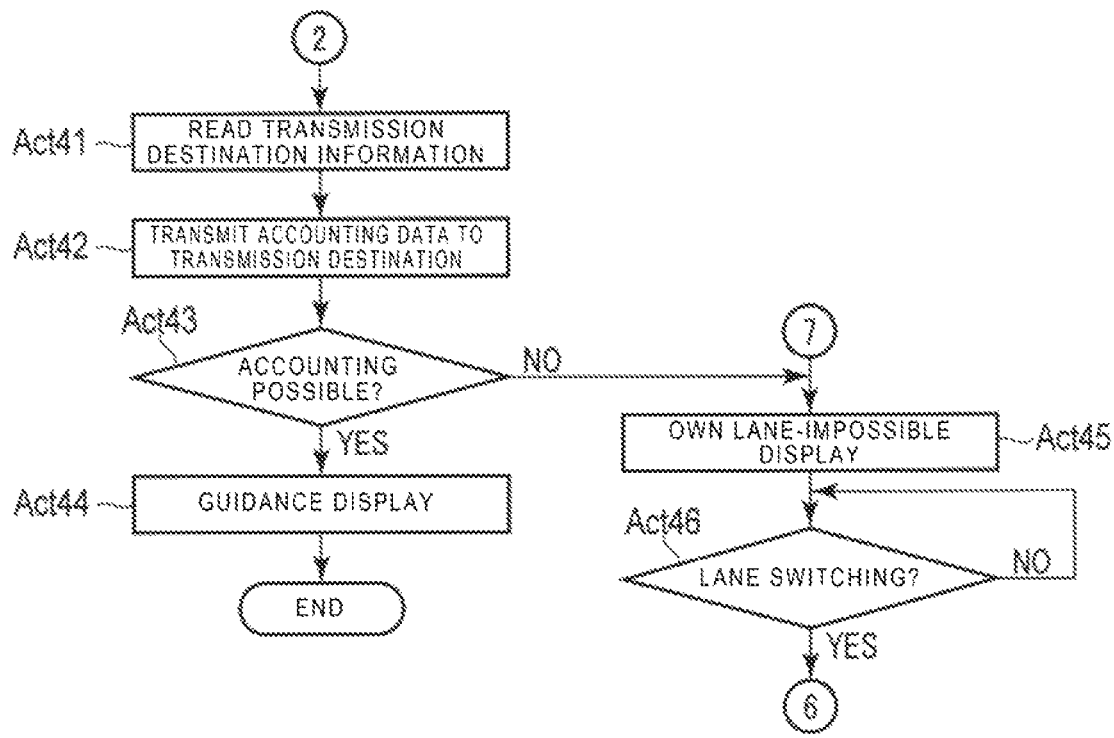

FIG. 6 illustrates information processing procedures when the accounting button B4 is pressed in a state in which the switching flag CF is set to "0". First, the CPU 11a reads transmission destination information stored in the transmission destination storage area M13 in Act 41. In Act 42, the CPU 11a outputs the accounting data generated through the process in Act 5 and the transmission destination information read through the process in Act 41 to the communication unit 11h. The CPU 11a instructs the communication unit 11h to transmit the accounting data and the transmission destination information with a settlement device identified by the transmission destination information, for example, the settlement device 12-1A as a destination. The communication unit 11h receives the instruction, then generates a first data message in which a communication address of the settlement device 12-1A identified by the transmission destination information is set as a transmission destination address, and sends the first data message to the LAN 13. The first data message includes the accounting data and the transmission destination information. A transmission source address of the first data message is a communication address of the registration device 11-1. The first data message is received by a single settlement device 12-1A in which the transmission destination address is set to a communication address thereof among the plurality of settlement devices 12-1A, 12-1B and 12-1C connected to the LAN 13. In other words, the communication unit 12h of the settlement device 12-1A receives, via the LAN 13, the first data message in which the transmission destination address is set to the communication address thereof. Here, the registration device 11-1 configures a first transmission unit which transmits accounting data to the settlement device 12-1A assigned to the registration device 11-1, in cooperation with the communication unit 11h through the processes in Act 41 and Act 42 executed by the CPU 11a.

If the first data message is received via the communication unit 12h, the CPU 12a of the settlement device 12-1A starts information processing according to the procedures illustrated in the flowchart of FIG. 11. This processing is performed according to the control program stored in the ROM 12b or the auxiliary storage unit 12d.

First, the CPU 12a checks whether or not an error such as a malfunction or a warning occurs in the settlement device 12-1A in Act 111. If an error does not occur (NO in Act 111), the CPU 12a determines whether or not a busy flag BF is set to "0" in Act 112. The busy flag BF is 1-bit information which is set to "0" while the settlement device 12-1A does not perform a settlement process, and is set to "1" from starting of the settlement process to ending thereof. A 1-bit data stored in the RAM 12c may be used as the busy flag BF.

If the busy flag BF is set to "0" (YES in Act 112), the CPU 12a sets the busy flag BF to "1" in Act 113. In Act 114, the CPU 12a stores the accounting data included in the first data message in an accounting buffer of the RAM 12c. In Act 115, the CPU 12a instructs the communication unit 12h to transmit an accounting-possible response command to the registration device 11-1 which is a first data message transmission source as a destination. The communication unit 12h receives the instruction, then generates an accounting-possible response command in which a transmission source address of the first data message is set as a transmission destination address, and sends the response command via the LAN 13. The transmission source address of the response command is a communication address of the settlement device 12-1A. The response command is received by the registration device 11-1 in which a transmission destination address is set to a communication address.

The CPU 12a of the settlement device 12-1A which transmitted the accounting-possible response command performs a settlement process of the transaction on the basis of the accounting data stored in the accounting buffer in Act 116. The settlement process is a process for settling a transaction shown in the accounting data according to an operation performed by the shopper 22, and is the same as a process in an existing self-checkout POS terminal or the like, and thus detailed description thereof will be omitted. When the settlement process is completed, the CPU 12a resets the busy flag BF to "0" in Act 117.

On the other hand, if an error occurs (YES in Act 111), or the busy flag BF is set to "1" (NO in Act 112), the CPU 12a reads transfer destination information stored in the transfer destination storage area M23 in Act 118. In Act 119, the CPU 12a checks whether or not a settlement device identified by the transmission destination information matches the settlement device identified by the transfer destination information included in the first data message.

If the settlement device identified by the transfer destination information does not match the settlement device identified by the transmission destination information (NO in Act 119), the CPU 12a outputs the accounting data and the transmission destination information included in the first data message to the communication unit 12h in Act 120. The CPU 12a instructs the communication unit 12h to transfer the first data message with a different settlement device identified as the transfer destination information, for example, the settlement device 12-1B as a destination. The communication unit 12h receives the instruction, then changes a transmission destination address of the first data message to a communication address of the settlement device 12-1B identified by the transfer destination information, and sends the first data message to the LAN 13. The first data message is received by the single settlement device 12-1B for which the transmission destination address is set to a communication address thereof. In other words, the communication unit 12h of the settlement device 12-1B receives the first data message in which the transmission destination address in the first data message sent to the LAN 13 is set to the communication address of the settlement device 12-1B.

As transfer destination information, information for identifying the settlement device 12-1A having the first priority is set in a settlement device having the lowest priority, for example, the settlement device 12-1C. Therefore, in the settlement device 12-1C, a settlement device identified by the transfer destination information matches a settlement device identified by transmission destination information. If the settlement device identified by the transfer destination information matches the settlement device identified by the transmission destination information (YES in Act 119), in Act 121, the CPU 12a instructs the communication unit 12h to transmit an accounting-impossible response command with the registration device 11-1 (the transmission source of the first data message) as a destination. The communication unit 12h receives the instruction, then generates an accounting-impossible response command in which a transmission source address of the first data message is set as the transmission destination address, and sends the response command to the LAN 13. A transmission source address of the response command corresponds to a communication address of the settlement device 12. The response command is received by the registration device 11-1 whose communication address corresponds to the transmission destination address.

As described above, the settlement device 12 performs a settlement process with respect to accounting data received via the LAN 13 in a state in which the settlement process can be performed. However, if an error occurs or accounting is in progress, and thus a settlement process cannot be performed, the settlement device 12 transfers accounting data to another settlement device via the LAN 13.

The CPU 11a of the registration device 11-1 which transmitted the accounting data in Act 42 in FIG. 6 waits for a response command in Act 43. If an accounting-possible response command is received via the communication unit 11h (YES in Act 43), the CPU 11a performs guidance display on the accounting confirmation screen SC2 in Act 44.

Figure 16:
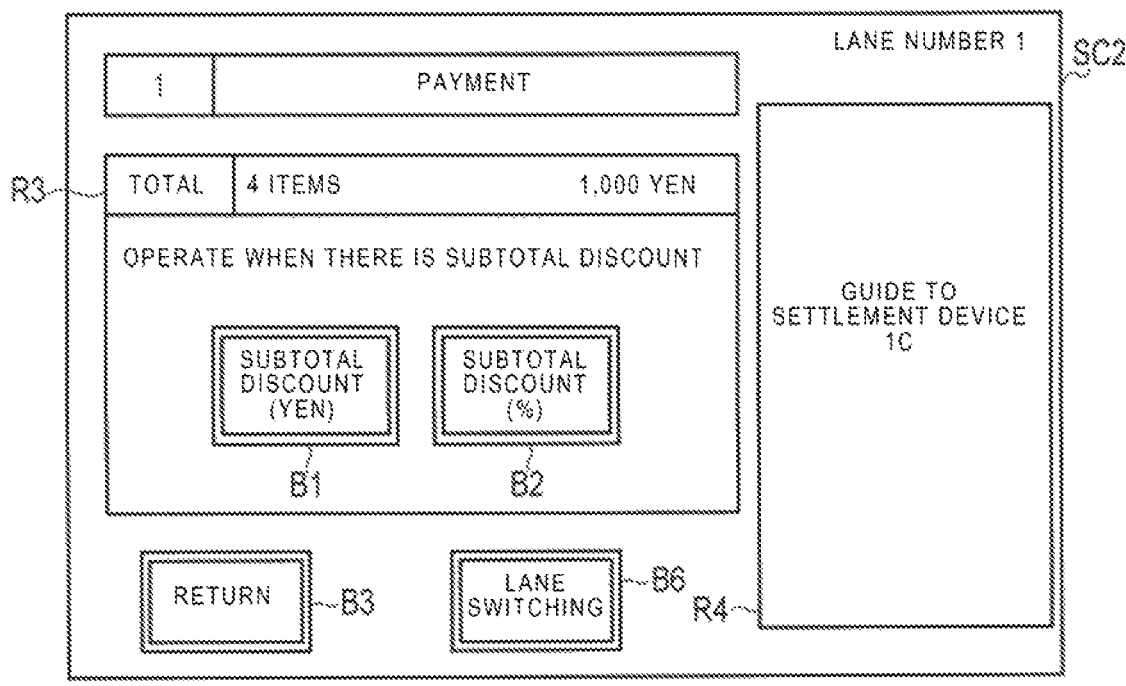
FIG. 16 illustrates an example accounting confirmation screen including guidance display.

FIG. 16 illustrates an example of the accounting confirmation screen SC2 on which guidance display is performed. This example corresponds to a case where an accounting-possible response command is transmitted from the settlement device 12-1C arranged in the same checkout lane as that of the registration device 11-1. The guidance display guides a customer to the settlement device 12-1C and notifying that a settlement process is possible. The guidance display is performed in the display region R4. The salesperson 21 guides the shopper 22 to the settlement device 12-1C in the same checkout lane indicated by the guidance display so that settlement is performed. For example, the shopper 22 is guided to the settlement device 12-1C, and performs settlement.

On the other hand, if an accounting-impossible response command is received from a settlement device having the lowest priority, for example, the settlement device 12-1C (NO in Act 43), the CPU 11a performs own lane-impossible display on the accounting confirmation screen SC2 in Act 45. The own lane-impossible display indicates that accounting cannot be performed in the settlement devices 12-1A, 12-1B and 12-1C assigned to the registration device 11-1, and prompts for accounting to be performed in another checkout lane. The own lane-impossible display is displayed in the display region R4. When the salesperson 21 recognizes the own lane-impossible display, the salesperson 21 presses the lane switching button B6.

The CPU 11a which performed the own lane-impossible display waits for the lane switching button B6 to be pressed in Act 46. When the lane switching button B6 is pressed (YES in Act 46), the CPU 11a proceeds to the process in Act 26. The CPU 11a performs the processes in Act 26 to Act 33. In this case, the switching flag CF is set to "0", and thus the processes in Act 34 to Act 36 are not performed. If the process in Act 33 is completed, the CPU 11a returns to the process in Act 21, and waits for the next pressing of a button. Here, when the accounting button B4 is pressed, the switching flag CF is set to "1", and the CPU 11a performs information processing according to the procedures illustrated in the flowchart of FIG. 7.

Figure 7:
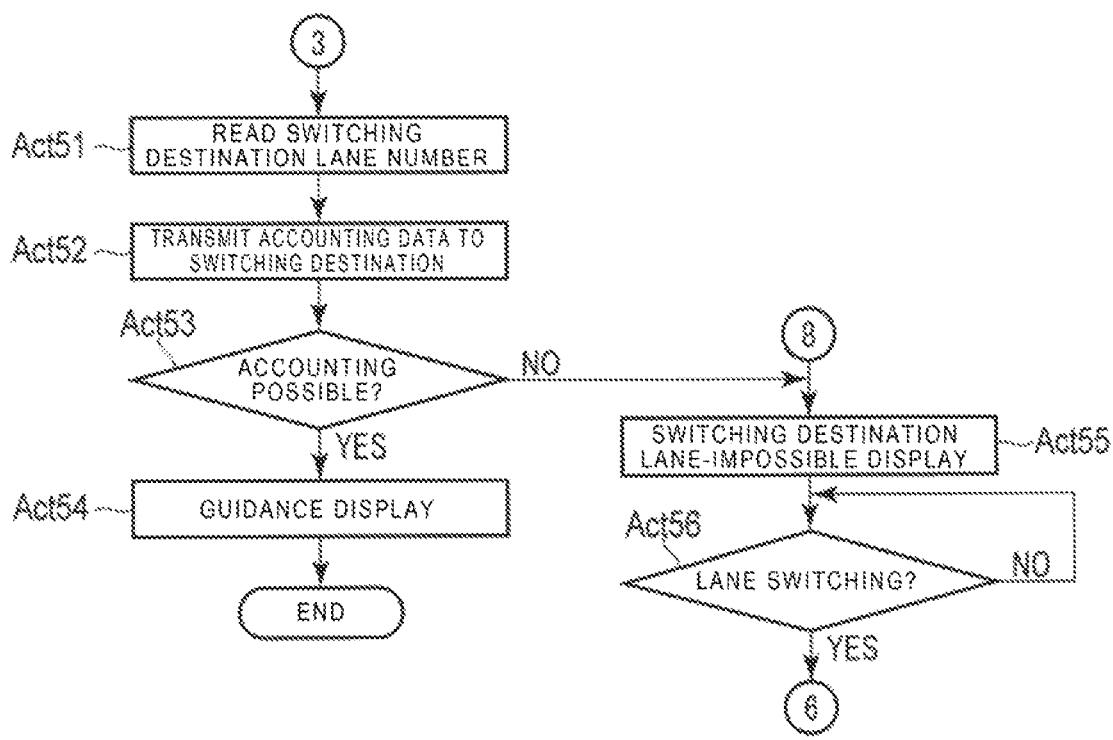

FIG. 7 illustrates information processing procedures when the accounting button B4 is pressed in a state in which the switching flag CF is set to "1". First, the CPU 11a reads a lane number stored in the switching destination memory 35 in Act 51. In Act 52, the CPU 11a outputs the lane number and the accounting data generated through the process in Act 5 to the communication unit 11h. The CPU 11a instructs the communication unit 11h to transmit the accounting data to a registration device arranged in a checkout lane specified by the lane number—for example, the registration device 11-2—as a destination. The communication unit 11h receives the instruction, then generates a second data message in which a communication address of the registration device 11-2 arranged in the checkout lane specified by the lane number is set as a transmission destination address, and sends the second data message to the LAN 13. The second data message includes the accounting data. The transmission source address of the second data message is the communication address of the registration device 11-1. The second data message is received by the registration device 11-2 for which the transmission destination address matches a communication address thereof. In other words, the communication unit 11h of the registration device 11-2 receives the second data message. Here, the registration device 11-1 functions as a second transmission unit which transmits accounting data to another registration device in cooperation with the communication unit 11h through the processes in Act 51 and Act 52 executed by the CPU 11a.

The CPU 11a of the registration device 11-2 that receives the second data message from registration device 11-1 starts information processing according to the procedures illustrated in the flowchart of FIG. 12. First, the CPU 11a reads transmission destination information stored in the transmission destination storage area M13 in Act 131. In Act 132, the CPU 11a outputs the accounting data included in the second data message and the transmission destination information read through the process in Act 131 to the communication unit 11h. The CPU 11a instructs the communication unit 11h to transmit the accounting data and the transmission destination information with a settlement device identified by the transmission destination information (for example, the settlement device 12-2A) as a destination. The communication unit 11h receives the instruction, then generates a third data message in which a communication address of the settlement device 12-2A identified by the transmission destination information is set as a transmission destination address, and sends the third data message via the LAN 13. The third data message includes the accounting data and the transmission destination information. The accounting data is the accounting data that was included in the second data message. A transmission source address of the third data message is the transmission source address of the second data message. The third data message is received by settlement device 12-2A for which the transmission destination address is set to a communication address thereof. In other words, the communication unit 12h of the settlement device 12-2A receives the third data message. Here, the registration device 11-2 functions as a third transmission unit which transmits accounting data transmitted from another registration device to a settlement device assigned to the registration device, in cooperation with the communication unit 11h through the processes in Act 131 and Act 132 executed by the CPU 11a.

The CPU 12a of the settlement device 12-2A receiving the third data message starts information processing according to the procedures illustrated in the flowchart of FIG. 11. If an error does not occur in the settlement device 12-2A, and the busy flag is set to "0", the CPU 12a performs processes in Act 113 to Act 117. In contrast, if an error occurs in the settlement device 12-2A, and the busy flag is set to "1", the CPU 12a performs processes in Act 118, Act 119 and Act 120, or processes in Act 118, Act 119 and Act 121.

The CPU 11a of the registration device 11-2 which transmitted the accounting data in Act 132 in FIG. 12 waits for a response command in Act 133. If an accounting-possible response command is received via the communication unit 11h (YES in Act 133), the CPU 11a reads a lane number stored in the lane number storage area M12 in Act 134. In Act 135, the CPU 11a instructs the communication unit 11h to transmit an accounting-possible response command along with the lane number to another registration device 11-1 which is a transmission source of the second data message. The communication unit 11h receives the instruction, then generates an accounting-possible response command in which a transmission source address of the second data message is set as transmission destination address, and sends the accounting-possible response command to the LAN 13. The response command includes the lane number. The response command is received by the registration device 11-1 whose communication address is set as the transmission destination address.

On the other hand, if an accounting-impossible response command is received via the communication unit 11h (NO in Act 133), the CPU 11a of the registration device 11-2 reads a lane number stored in the lane number storage area M12 in Act 136. In Act 137, the CPU 11a instructs the communication unit 11h to transmit the accounting-impossible response command along with the lane number to another registration device 11-1 which is a transmission source of the second data message. The communication unit 11h receives the instruction, then generates an accounting-impossible response command in which a transmission source address of the second data message is set as transmission destination address, and sends the accounting-impossible response command to the LAN 13. The response command includes the lane number. The response command is received by the registration device 11-1 whose communication address is set as the transmission destination address.

The CPU 11a of the registration device 11-1 which transmitted the accounting data in Act 52 in FIG. 7 waits for the response command in Act 53. If the accounting-possible response command including the lane number is received from registration device 11-2 via the communication unit 11h (YES in Act 53), the CPU 11a performs guidance display on the accounting confirmation screen SC2 in Act 54.

Figure 17:
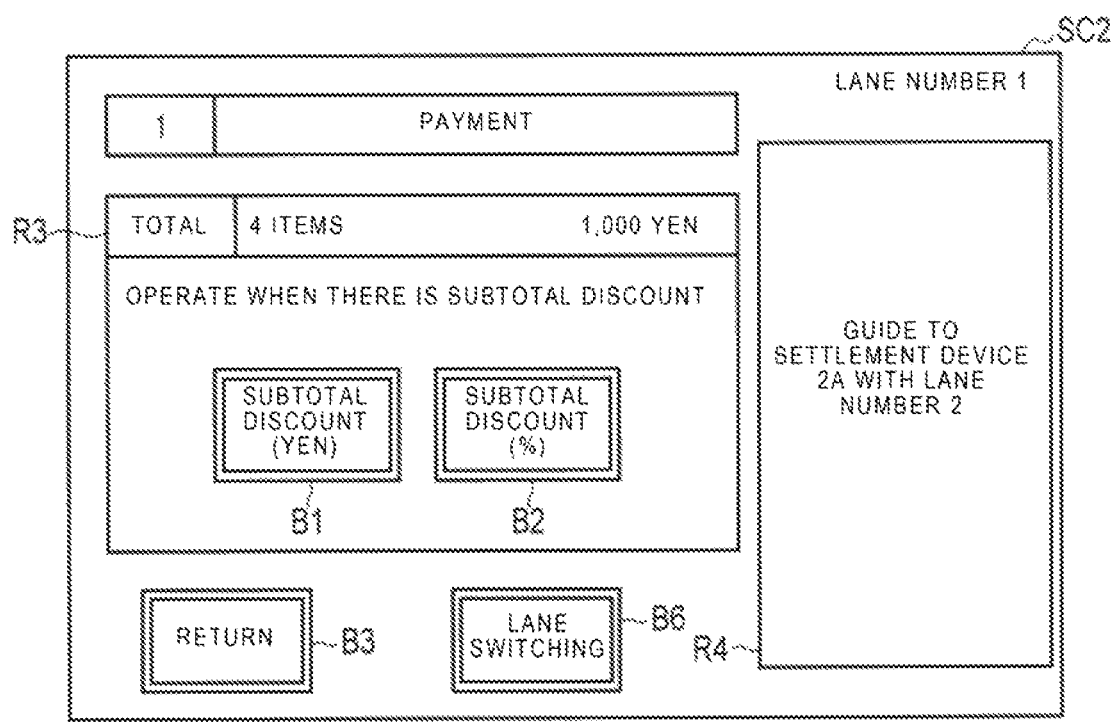
FIG. 17 illustrates an example accounting confirmation screen during switching between lanes, including guidance display.

FIG. 17 illustrates an example of the accounting confirmation screen SC2 on which guidance display is performed as a result of receiving an accounting-possible response command including the lane number. This example corresponds to a case where an accounting-possible response command is transmitted from the settlement device 12-2A arranged in a checkout lane which is different from that of the registration device 11-1. The guidance display guides a customer to the settlement device 12-2A, and notifies that a settlement process is possible. The guidance display is performed in the display region R4. The salesperson 21 recognizes the guidance display and guides the shopper 22 to the settlement device 12-2A in another checkout lane indicated by the guidance display so that settlement can be performed.

On the other hand, if a response received from another registration device 11-2 is an accounting-impossible response command (NO in Act 53), the CPU 11a displays the switching destination lane-impossible display on the accounting confirmation screen SC2 in Act 55. The switching destination lane-impossible display indicates that accounting cannot be performed in the settlement devices 12-2A, 12-2B and 12-2C assigned to another registration device 11-2 selected as a switching destination of accounting data, and is a display for prompting accounting to be performed in the own checkout lane. The switching destination lane-impossible display is displayed in the display region R4. The salesperson 21 recognizing the switching destination lane-impossible display presses the lane switching button B6 without entering a lane number.

The CPU 11a waits for the lane switching button B6 to be pressed in Act 56. If the lane switching button B6 is pressed (YES in Act 56), the CPU 11a proceeds to the process in Act 26. The CPU 11a performs the above-described processes in Act 34 to Act 36. In this case, since a lane number is not entered, and the switching flag CF is set to "1", the processes in Acts 27, 28, and 30 to 33 are not performed. When the process in Act 36 is completed, the CPU 11a returns to the process in Act 21, and waits for the next pressing of a button. Here, if the accounting button B4 is pressed, the switching flag CF is set to "0", and the CPU 11a performs information processing according to the procedures illustrated in the flowchart of FIG. 6.

A case is assumed in which the salesperson 21 presses the accounting button B4 in a state in which the accounting confirmation screen SC2 illustrated in FIG. 14 is displayed. In this case, accounting data generated by the registration device 11-1 is first transmitted to the settlement device 12-1A having the first priority. At this time, since an error occurs in the settlement device 12-1A, the accounting data is transferred to the settlement device 12-1B having the second priority from the settlement device 12-1A. However, since the settlement device 12-1B currently performs accounting, the accounting data is transferred to the settlement device 12-1C having the third priority from the settlement device 12-1B. The settlement device 12-1C is in a waiting state. Therefore, the shopper 22 is guided to the settlement device 12-1C by displaying the accounting confirmation screen SC2 as illustrated in FIG. 16. As a result, the shopper 22 can perform settlement with the settlement device 12-1C.

A case is assumed in which the settlement device 12-1C currently performs accounting, and thus cannot perform a settlement process. In this case, own lane-impossible display is displayed on the accounting confirmation screen SC2. Therefore, the salesperson 21 presses the lane switching button B6. Thus, as illustrated in FIG. 15, states of the settlement devices 12 in another checkout lane (for example, the checkout lane with the lane number "2") are displayed in the order of higher priority in the display region R4 of the accounting confirmation screen SC2. Here, if the salesperson 21 presses the accounting button B4, accounting data is first transmitted to another registration device 11-2. The accounting data is transmitted to the settlement device 12-1A having the first priority through an operation in the registration device 11-2. The settlement device 12-2A is in a waiting state, and can thus perform a settlement process. Therefore, an accounting-possible response command is transmitted from the registration device 11-2 to the registration device 11-1. The response command includes the lane number "2" of another checkout lane. As illustrated in FIG. 17, the shopper 22 is guided to the settlement device 12-2A with the lane number "2" with the accounting confirmation screen SC2. As a result, the shopper 22 can perform settlement at the settlement device 12-2A.

As mentioned above, according to the checkout system 10, a settlement process target device is not only the settlement devices 12-1A, 12-1B and 12-1C in the own lane assigned to the registration device 11-1 but also the settlement devices 12-2A, 12-2B and 12-2C in another lane assigned to another registration device 11-2. Even if the settlement device 12 in any checkout lane is used as a settlement target device, the registration device 11-1 is not required to select the settlement device 12 which is a transmission destination of accounting data. If there is even a single settlement device 12 in a state in which a settlement process is possible, a settlement process can be performed. Therefore, since purchase registration is less delayed in the registration device 11, it is possible to efficiently perform processes for purchase registration and settlement.

Meanwhile, it is possible to understand states of a plurality of settlement devices 12-1A, 12-1B and 12-1C assigned to the registration device 11-1 by checking the display region R4 of the accounting confirmation screen SC2 illustrated in FIG. 14. Similarly, it is possible to understand states of a plurality of settlement devices 12-2A, 12-2B and 12-2C assigned to the registration device 11-2 in another checkout lane which is a transmission destination of accounting data by checking the display region R4 of the accounting confirmation screen SC2 illustrated in FIG. 15. Here, for example, if there is an error in the settlement device 12-1A having the first priority, it is easy to change priority so that other settlement devices 12-1B and 12-1C have the first priority. Therefore, to change priority, the salesperson 21 presses the priority changing button B5.

Figure 8:
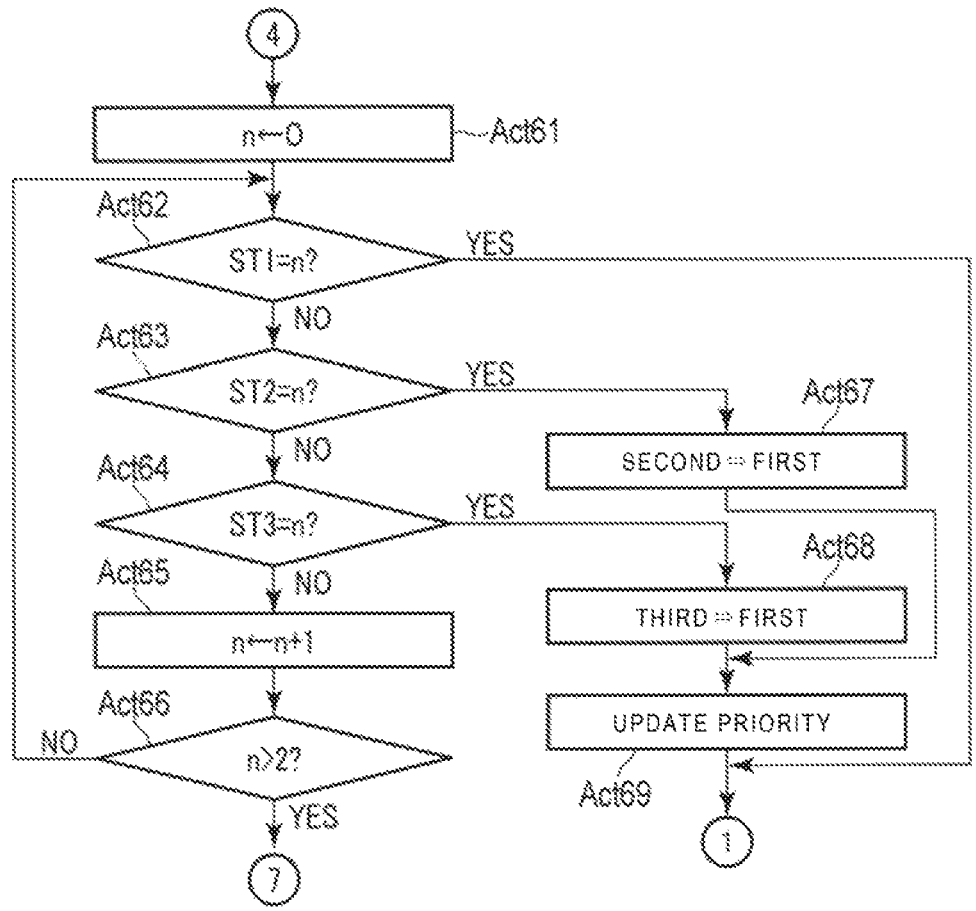

FIG. 8 illustrates information processing procedures when the priority changing button B5 is pressed in a state in which the switching flag CF is set to "0", that is, the accounting confirmation screen SC2 illustrated in FIG. 14 is displayed. Here, for convenience of description, it is assumed that the settlement device 12-1A has the first priority, the settlement device 12-1B has the second priority, and the settlement device 12-1C has the third priority, before priority is changed.

First, the CPU 11a resets a counter n to "0" in Act 61. The counter n is formed in the RAM 11c. Next, in Act 62, the CPU 11a searches the priority memory 34 so as to check whether or not status information ST1 correlated with the number "1" matches the counter n. At this point, the counter n is "0". Therefore, if the status information ST1 is "0 (waiting state)", matching is determined. If the status information ST1 matches the counter n (YES in Act 62), the CPU 11a returns to process in Act 21 in FIG. 5, and waits for the next pressing of a button.

If the status information ST1 does not match the counter n (NO in Act 62), the settlement device 12-1A is not in a waiting state. In this case, in Act 63, the CPU 11a checks whether or not status information ST2 correlated with the number "2" matches the counter n. If the status information ST2 matches the counter n (YES in Act 63), that is, the settlement device 12-1B is in a waiting state, the CPU 11a substitutes a settlement device ID, an identification name, and status information correlated with the number "2" for a settlement device ID, an identification name, and status information correlated with the number "1" in Act 67. As a result, the settlement device 12-1B in a waiting state has the first priority, and the settlement device 12-1A having the first priority is changed to have the second priority. Then, the CPU 11a updates priority in Act 69.

If status information ST2 does not also match the counter n (NO in Act 63), the settlement device 12-1A and the settlement device 12-1B are not in a waiting state. In this case, in Act 64, the CPU 11a checks whether or not status information ST3 correlated with the number "3" matches the counter n. If the status information ST3 matches the counter n (YES in Act 64), that is, the settlement device 12-1C is in a waiting state, the CPU 11a substitutes a settlement device ID, an identification name, and status information correlated with the number "3" for a settlement device ID, an identification name, and status information correlated with the number "1" in Act 68. As a result, the settlement device 12-1C in awaiting state has the first priority, and the settlement device 12-1A having the first priority is changed to have the third priority. Then, the CPU 11a updates priority in Act 69.

If status information ST3 does not also match the counter n (NO in Act 64), neither of the settlement device 12-1A, the settlement device 12-1B, and the settlement device 12-1C are in a waiting state. In this case, the counter n is incremented by "1" in Act 65. The CPU 11a checks whether or not the counter n exceeds the maximum value "2" of status information in Act 66. If the counter n does not exceed the maximum value "2" of status information (NO in Act 66), the CPU 11a returns to the process in Act 62. The CPU 11a repeatedly performs the subsequent processes in the same as described above.

In these repeatedly performed processes, if the settlement devices 12-1B and 12-1C are not in awaiting state, and the settlement device 12-1A is in an accounting state (the status information ST1 is "1"), priority is not changed. If the settlement device 12-1A is in an error state (the status information ST1 is "2"), and the settlement device 12-1B is in an accounting state (the status information ST2 is "1"), then the settlement device 12-1B is changed to have the first priority, and the settlement device 12-1A is changed to have the second priority. If the settlement device 12-1A and the settlement device 12-1B are in an error state, and the settlement device 12-1C is in an accounting state (the status information ST3 is "1"), then the settlement device 12-1C is changed to have the first priority, and the settlement device 12-1A is changed to have the third priority.

If all of the settlement devices 12-1A, 12-1B and 12-1C are in an error state, the counter n becomes "3". If the counter n becomes "3" (YES in Act 66), the CPU 11a proceeds to the process in Act 45 in FIG. 6, and displays an own lane-impossible display on the accounting confirmation screen SC2.

In Act 69, specifically, the CPU 11a uses, as transmission destination information in the transmission destination storage area M13, information for identifying a settlement device identified by the settlement device ID correlated with the number "1" in the priority memory 34, for example, the settlement device 12-1C. The CPU 11a transmits the data of the priority memory 34 to all of the settlement devices 12-1A, 12-1B and 12-1C arranged in the same checkout lane. The CPU 12a of each of the settlement devices 12-1A, 12-1B and 12-1C receives the data of the priority memory 34 and updates transfer destination information stored in the transfer destination storage area M23 to information regarding a settlement device correlated with the number "2" (for example, the settlement device 12-1B) when a settlement device ID thereof is correlated with the number "1". The CPU 12a updates transfer destination information stored in the transfer destination storage area M23 to information regarding a settlement device correlated with the number "3", for example, the settlement device 12-1A, when the settlement device ID thereof is correlated with the number "2". The CPU 12a updates transfer destination information stored in the transfer destination storage area M23 to information regarding the settlement device 12-1C correlated with the number "1" when the settlement device ID thereof is correlated with the number "3". Thus, the priority changed through the processes in Act 61 to Act 68 is set in the registration device 11-1 and the settlement devices 12-1A, 12-1B and 12-1C assigned to the registration device 11-1.

If the process in Act 69 is completed, the CPU 11a returns to the process in Act 21, and waits for the next pressing of a button.

Figure 9:
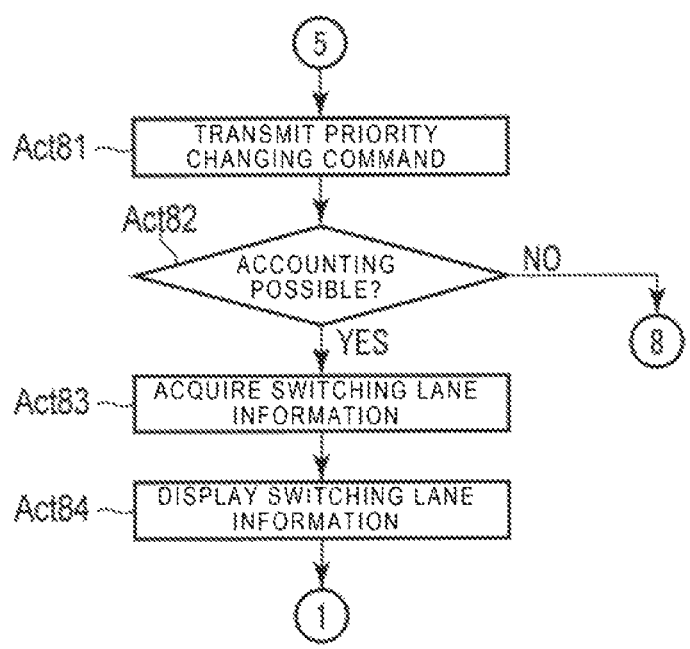

FIG. 9 illustrates information processing procedures when the priority changing button B5 is pressed in a state in which the switching flag CF is set to "1". In Act 81, first, the CPU 11a gives an instruction for transmitting a priority changing command with another registration device 11-2 arranged in a checkout lane with a lane number stored in the switching destination memory 35 as a destination. The communication unit 11h receives the instruction, and then sends the priority changing command in which a communication address of another registration device 11-2 is set as a transmission destination address to the LAN 13. A transmission source address of the priority changing command is a communication address of the registration device 11-1. The priority changing command is received by the registration device 11-2 whose communication address is set as the transmission destination address.

The CPU 11a of the registration device 11-2 that receives the priority changing command starts information processing according to the procedures illustrated in the flowchart of FIG. 10. First, in Act 91, the CPU 11a checks whether or not a received command is a priority changing command. If the received command is a priority changing command (YES in Act 91), the CPU 11a performs the processes in Act 61 to Act 69 in FIG. 8 in Act 92 to Act 100. If the process in Act 100 is completed, the CPU 11a instructs the communication unit 11h to transmit an accounting-possible response command along with the data of the priority memory 34 to the registration device 11-1 (which is a transmission source of the priority changing command) in Act 101. The communication unit 11h receives the instruction, then generates an accounting-possible response command in which a transmission source address of the priority changing command is set as a transmission destination address, and sends the accounting-possible response command to the LAN 13. The response command includes the data of the priority memory 34. The response command is received by the registration device 11-1 whose communication address is set as the transmission destination address.

On the other hand, if the counter n reaches "3" in Act 97 (YES in Act 97), the CPU 11a instructs the communication unit 11h to transmit an accounting-impossible response command to another registration device 11-1 which is a transmission source of the priority changing command in Act 102. The communication unit 11h receives the instruction, generates an accounting-impossible response command in which a transmission source address of the priority changing command is set as a transmission destination address, and sends the accounting-impossible response command to the LAN 13. The response command is received by the registration device 11-1 whose communication address is set as the transmission destination address.

The CPU 11a of the registration device 11 which transmitted the priority changing command waits for a response command in Act 82. Here, if an accounting-impossible response is received (NO in Act 82), the CPU 11a proceeds to the process in Act 55 in FIG. 7, and performs switching lane-impossible display on the accounting confirmation screen SC2.

If an accounting-possible response is received (YES in Act 82), the CPU 11a acquires switching lane information in Act 83. This process is the same as the process in Act 10 or Act 32. If the switching lane information is acquired, in Act 84, the CPU 11a updates the content of the display region R4 of the accounting confirmation screen SC2 to include the switching lane information acquired through the process in Act 83. The CPU 11a then returns to the process in Act 21, and waits for the next pressing of a button.

As mentioned above, since the salesperson 21 presses the priority changing button B5 in a state in which the accounting confirmation screen SC2 illustrated in FIG. 14 is displayed, priorities of the settlement devices 12-1A, 12-1B and 12-1C assigned to the registration device 11-1 can be easily changed. As mentioned above, since the salesperson 21 presses the priority changing button B5 in a state in which the accounting confirmation screen SC2 illustrated in FIG. 15 is displayed, priorities of the settlement devices 12-2A, 12-2B and 12-2C assigned to the registration device 11-2 to which accounting data is transmitted can also be easily changed.

In the embodiment, an information processing operation of the checkout system 10 was described focusing on the registration device 11-1. However, the same operation is also performed when focusing on the registration device 11-2.

Hereinafter, another embodiment will be described.

In the above-described embodiment, the lane switching button B6 is displayed on the accounting confirmation screen SC2. In another embodiment, as illustrated in FIG. 18, the lane switching button B6 is displayed in a region other than the region of the registration screen SC1 along with a subtotal button B8 or the like. If the lane switching button B6 is pressed before registration completion is declared, the CPU 11a performs the processes in Act 26 to Act 36 in FIG. 5. Thereafter, the CPU 11a proceeds to the process in Act 4. This embodiment can also achieve the same operations and results as those in the above-described embodiment.

In other words, according to each embodiment, there is disclosed a checkout system including a plurality of registration devices each having a generation unit which generates accounting data required for settlement of a transaction on the basis of input data, and a plurality of settlement devices performing a settlement process on the basis of the accounting data in cooperation with the registration devices. Each of the registration devices includes a switching instruction unit (e.g., lane switching button B6) that gives an instruction for switching a transmission destination of accounting data from a cooperating settlement device to another registration device.

In the above-described embodiment, if an accounting-impossible response command is received from the settlement device 12, and the own lane-impossible display is displayed on the accounting confirmation screen SC2, the CPU 11a of the registration device 11 waits for the lane switching button B6 to be pressed in Act 46. Here, if an instruction for not changing a checkout lane is given, the CPU 11a may perform a transmission-impossible process. In the transmission-impossible process, for example, a unique identification code is added to accounting data which is then transmitted to a server, and the printer 11g is driven so as to issue an accounting ticket on which a barcode indicating the identification code is printed. The accounting ticket is forwarded to a shopper. The shopper reads the barcode of the accounting ticket by using, for example, the scanner 12e of the settlement device 12 prepared in a location separated from a checkout lane. Thus, the CPU 12a of the settlement device 12 acquires the accounting data attached to the identification code obtained from the barcode from the server. The CPU 12a performs a settlement process on the basis of the accounting data.

In the above-described embodiment, the registration device 11 transmits accounting data to a single settlement device 12 which is designated as a transmission destination. If a settlement process cannot be performed in the settlement device 12, the settlement device 12 transfers the accounting data to another settlement device 12 designated as a transfer destination. The settlement device 12 which can perform a settlement process performs the settlement process on the basis of the accounting data. In another embodiment, the registration device 11 transfers accounting data to all of the cooperating settlement devices 12. Each settlement device 12 recognizes a state of another settlement device 12, and determines the settlement device 12 which will perform a settlement process, and the determined settlement device 12 performs a settlement process on the basis of the accounting data. Also in this checkout system, the registration device 11 includes the first to third transmission units and the first and second display units, and can thus efficiently perform processes for purchase registration and settlement.

The registration device 11 and the settlement device 12 may be provided in a state in which a control program is stored in the ROMs 11b and 12b or the auxiliary storage units 11d and 12d. However, this is only an example, and a control program which is assigned separately from a computer may be written to a writable storage device of the computer according to an operation performed by a user or the like. The control program may be assigned by writing the control program on a removable recording medium, or through communication using a network. The recording medium may have any form as long as the recording medium can store a program, such as a CD-ROM or a memory card, and can be read by a device. The program may be installed or downloaded in cooperation with an operating system (OS) of a device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A checkout system comprising:
a plurality of registration devices, each registration device arranged in one of a plurality of lanes for checkout, including a registration processor, a registration communication interface and a registration display, and being configured to:
upon receipt of input of data for registering a commodity for a transaction, generate accounting data for settlement of the transaction on a basis of the input data,
determine a transmission destination, and
transmit the accounting data to the determined transmission destination; and
a plurality of settlement devices assigned to, and arranged in the same lane as, a first registration device, which is one of the plurality of registration devices, each settlement device including a settlement processor and a settlement communication interface, and having a priority ranking among the settlement devices assigned to the first registration device, each settlement device being configured to:
upon receipt of the accounting data from the first registration device, determine a current status of the settlement device,
transmit the determined current status to the first registration device, and
perform a settlement process for settlement of the transaction on a basis of the accounting data transmitted from the first registration device, wherein:
the first registration device is configured to display either a list of the settlement devices in a first lane where the first registration device is arranged or a list of the settlement devices in a second lane where a second registration device is arranged, display the status and lane information of each of the settlement devices that are displayed, and display a button for switching a display of the status and lane information of the settlement devices in the first lane to a display of the status and lane information of the settlement devices in the second lane and vice versa, and wherein the first registration device determines the transmission destination based at least on the status and the priority ranking of the settlement devices that are currently displayed.

2. The system according to claim 1, wherein the first registration device selects one of the settlement devices assigned to the first registration device and the settlement devices assigned to the second registration device, as the transmission destination.

3. The system according to claim 1, wherein the first registration device is configured to change the priority ranking among the settlement devices that are in the list currently displayed, based on an instruction for changing the priority.

4. The system according to claim 1, wherein, when the currently displayed list includes the settlement devices assigned to the second registration device, changing the priority includes sending an instruction to change the priority to the second registration device.

5. The system according to claim 1, wherein the determined status is one of: a waiting state in which new settlement processing can be performed, an accounting state in which settlement processing of a prior transaction is being performed, and an error state in which a malfunction in the settlement device occurs.

6. The system according to claim 1, wherein the list that is initially displayed is a default list that can be changed by user operation.

7. The system according to claim 6, wherein:
the default list is generated based on whether a transmission destination for settlement of a prior transaction was one of the plurality of the settlement devices assigned to the second registration device.

8. A registration device for use in a checkout system that includes a plurality of registration devices each arranged in one of a plurality of lanes for checkout, and a plurality of settlement devices assigned to, and arranged in the same lane as, one of the plurality of registration devices, the registration device comprising:
a registration processor;
a registration communication interface; and
a registration display, the registration device being configured to:
upon receipt of input of data for registering a commodity for a transaction, generate accounting data for settlement of the transaction on a basis of the input data,
upon receipt of a current status of either each of the plurality of the settlement devices in a first lane where the registration device is arranged or each of the plurality of the settlement devices in a second lane where a different registration device is arranged, display either a list of the settlement devices in the first lane or a list of the settlement devices in the second lane, display the status and lane information of each of the settlement devices that are displayed, and display a button for switching a display of the status and lane information of the settlement devices in the first lane to a display of the status and lane information of the settlement devices in the second lane and vice versa,
determine a transmission destination based least on the status and the priority ranking of the settlement devices that are currently displayed, and
transmit the accounting data to the determined transmission destination.

9. The device according to claim 8, wherein the registration device selects one of the settlement devices assigned to the registration device and the settlement devices assigned to the different registration device, as the transmission destination.

10. The device according to claim 8, wherein the registration device is configured to change the priority ranking among the settlement devices that are in the list currently displayed, based on an instruction for changing the priority.

11. The device according to claim 10, wherein, when the currently displayed list includes the settlement devices assigned to the different registration device, changing the priority includes sending an instruction to change the priority to the different registration device.

12. The device according to claim 8, wherein the received status of each settlement device is one of: a waiting state in which new settlement processing can be performed, an accounting state in which settlement processing of a prior transaction is being performed, and an error state in which a malfunction in the settlement device occurs.

13. The device according to claim 8, wherein the list that is initially displayed is a default list that can be changed by user operation.

14. The device according to claim 13, wherein:
the default list is generated based on whether a transmission destination for settlement of a prior transaction was one of the plurality of the settlement devices assigned to the different registration device.

15. A checkout method for use in a checkout system that includes a plurality of registration devices each arranged in one of a plurality of lanes for checkout, and a plurality of settlement devices assigned to, and arranged in the same lane as, one of the plurality of registration devices, the method comprising:
receiving by a first registration device, input of data for registering a commodity for a transaction;
generating by the first registration device, accounting data for settlement of the transaction on a basis of the input data;
receiving by the first registration device, a current status of either each of the plurality of the settlement devices in a first lane where the first registration device is arranged or each of the plurality of the settlement devices in a second lane where a second registration device is arranged;
displaying by the first registration device, either a list of the settlement devices in the first lane or a list of the settlement devices in the second lane, displaying the status and lane information of each of the settlement devices that are displayed, and displaying a button for switching a display of the status and lane information of the settlement devices in the first lane to a display of the status and lane information of the settlement devices in the second lane and vice versa;
determining by the first registration device, a transmission destination based at least on the status and the priority ranking of the plurality of settlement devices that are currently displayed; and transmitting by the first registration device, the accounting data to the determined transmission destination.

16. The method according to claim 15, wherein the transmission destination is selected from the settlement devices assigned to the first registration device and the settlement devices assigned to the second registration device.

17. The method according to claim 15, further comprising:
changing by the first registration device, the priority ranking among the settlement devices that are in the list currently displayed, based on an instruction for changing the priority, and
when the currently displayed list includes the settlement devices assigned to the second registration device, sending by the first registration device, an instruction to change the priority to the second registration device.

18. The method according to claim 15, wherein the received status of each settlement device is one of: a waiting state in which new settlement processing can be performed, an accounting state in which settlement processing of a prior transaction is being performed, and an error state in which a malfunction in the settlement device occurs.

19. The checkout system according to claim 1, wherein when the button is operated, the first registration device obtains the status of each of the plurality of settlement devices in the first or second lane to be displayed.

* * * * *